(12) United States Patent
Weir et al.

(10) Patent No.: US 9,519,881 B2
(45) Date of Patent: Dec. 13, 2016

(54) ESTIMATING JOURNEY DESTINATION BASED ON POPULARITY FACTORS

(71) Applicant: TOYOTA JIDOSHA KABUSHIKI KAISHA, Toyota-shi, Aichi-ken (JP)

(72) Inventors: David Frank Russell Weir, San Jose, CA (US); Roger Melen, Los Altos Hills, CA (US)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 277 days.

(21) Appl. No.: 14/059,407

(22) Filed: Oct. 21, 2013

(65) Prior Publication Data

US 2015/0112919 A1    Apr. 23, 2015

(51) Int. Cl.
  *G06Q 10/08* (2012.01)
  *G06N 5/04* (2006.01)
  *G01C 21/34* (2006.01)

(52) U.S. Cl.
  CPC ..... *G06Q 10/08355* (2013.01); *G01C 21/3476* (2013.01)

(58) Field of Classification Search
  CPC .................. G01C 21/3476; G06Q 10/08355
  See application file for complete search history.

(56) References Cited

U.S. PATENT DOCUMENTS

| | | | | |
|---|---|---|---|---|
| 2008/0097873 A1* | 4/2008 | Cohen | ................ | G06Q 30/0603 705/26.1 |
| 2010/0131187 A1* | 5/2010 | Lai | ........................ | G01C 21/32 701/532 |
| 2010/0138151 A1* | 6/2010 | Jang | ..................... | G08G 1/0969 701/533 |
| 2011/0055204 A1* | 3/2011 | Jung | .................... | G06F 17/3087 707/722 |
| 2012/0197714 A1* | 8/2012 | Beyeler | .............. | G01C 21/3682 705/14.49 |
| 2012/0324389 A1* | 12/2012 | Meng | ................. | G01C 21/3682 715/771 |
| 2013/0103697 A1* | 4/2013 | Hill | ................... | G06F 17/30312 707/748 |
| 2013/0173157 A1* | 7/2013 | Bellesfield | ......... | G01C 21/3476 701/533 |

OTHER PUBLICATIONS

Chen, Zaiben et al., "Discovering Popular Routes from Trajectories," 2011 IEEE 27th International Conference on Data Engineering (ICDE), Apr. 11-16, 2011, 12 pages.

(Continued)

*Primary Examiner* — Mussa A Shaawat
*Assistant Examiner* — Abdhesh Jha
(74) *Attorney, Agent, or Firm* — Patent Law Works LLP

(57) ABSTRACT

The disclosure includes technology for estimating journey destinations based on crow-sourced popularity factors. The technology includes an example system including a processor and a memory storing instructions that when executed cause the system to: receive location data; determine a current route associated with a user based on the location data; determine one or more crowd-sourced popularity factors; estimate one or more destination estimations along the current route based on the one or more crowd-sourced popularity factors; and suggest the one or more destination estimations to the user.

18 Claims, 16 Drawing Sheets

(56) References Cited

OTHER PUBLICATIONS

Krumm, John et al., "From Destination Prediction to Route Prediction", Journal of Location Based Services, May 9, 2013, pp. 98-120, vol. 7, No. 2, Taylor & Francis.
Krumm, John, "Where Will They Turn: Predicting Turn Proportions at Intersections," Personal and Ubiquitous Computing, Oct. 2010, 13 pages, vol. 14, Issue 7, Springer-Verlag, London, UK.
Krumm, "Trajectory Analysis for Driving" pp. 230-236 from "Computing with Spatial Trajectories", Jul. 2011, Springer.

* cited by examiner

US 9,519,881 B2

ESTIMATING JOURNEY DESTINATION BASED ON POPULARITY FACTORS

BACKGROUND

The specification relates to estimating journey destinations. In particular, the specification relates to estimating journey destinations based on one or more crowd-sourced popularity factors.

Existing technologies may estimate a journey destination for a user when the user takes on a journey. For example, existing technologies may use machine learning techniques to estimate a journey destination for a user based on the user's frequent trips. However, if the user is traveling in an unfamiliar area or in an unfamiliar route, existing technologies may fail to estimate journey destinations for the user.

SUMMARY

According to one innovative aspect of the subject matter described in this disclosure, a system for estimating journey destinations based on crowd-sourced popularity factors includes a processor and a memory storing instructions that, when executed, cause the system to receive location data; determine a current route associated with a user based on the location data; determine one or more crowd-sourced popularity factors; estimate one or more destination estimations along the current route based on the one or more crowd-sourced popularity factors; and suggest the one or more destination estimations to the user.

In general, another innovative aspect of the subject matter described in this disclosure may be embodied in methods that include receiving location data; determining a current route associated with a user based on the location data; determining one or more crowd-sourced popularity factors; estimating one or more destination estimations along the current route based on the one or more crowd-sourced popularity factors; and suggesting the one or more destination estimations to the user.

Other aspects include corresponding methods, systems, apparatus, and computer program products for these and other innovative aspects.

These and other implementations may each optionally include one or more of the following features. For instance, the operations include determining that the user is traveling toward a first destination region from the one or more destination regions; estimating one or more refined destinations within the first destination region based on the one or more crowd-sourced popularity factors; and providing the one or more refined destinations to the user.

For instance, the features include receiving data describing a set of potential destinations; determining an overall popularity for each potential destination; determining a variable popularity for each potential destination; determining a destination saturation level for each potential destination; determining a schedule popularity based on schedule data associated with the user; the overall popularity for a particular potential destination being determined based on a number of total visits to the particular potential destination in comparison to other potential destinations included in the set; that the variable popularity being determined based at least in part on one or more of a time of day, a day of week, a weather condition, a date, and a schedule of events; that the destination saturation level for a particular potential destination being determined based on a comparison between a total number of people possibly to be accommodated at the particular potential destination and an actual number of people at the particular potential destination; determining a popularity score for each potential destination based at least in part on one or more of the overall popularity, the variable popularity, the destination saturation level, and the schedule popularity; and determining the one or more popular destinations from the set of potential destinations based on popularity scores for the set of potential destinations; and clustering the one or more popular destinations into one or more destination regions.

The disclosure is particularly advantageous in a number of respects. For example, the technology described herein can estimate journey destinations for a user even if the user is in an unfamiliar route or an unfamiliar area and the technology can iteratively estimate the journey destinations for the user based on the user's current locations and/or one or more crowd-sourced popularity factors associated with nearby destinations. It should be understood that the foregoing advantages are provided by way of example and the technology may have numerous other advantages and benefits.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
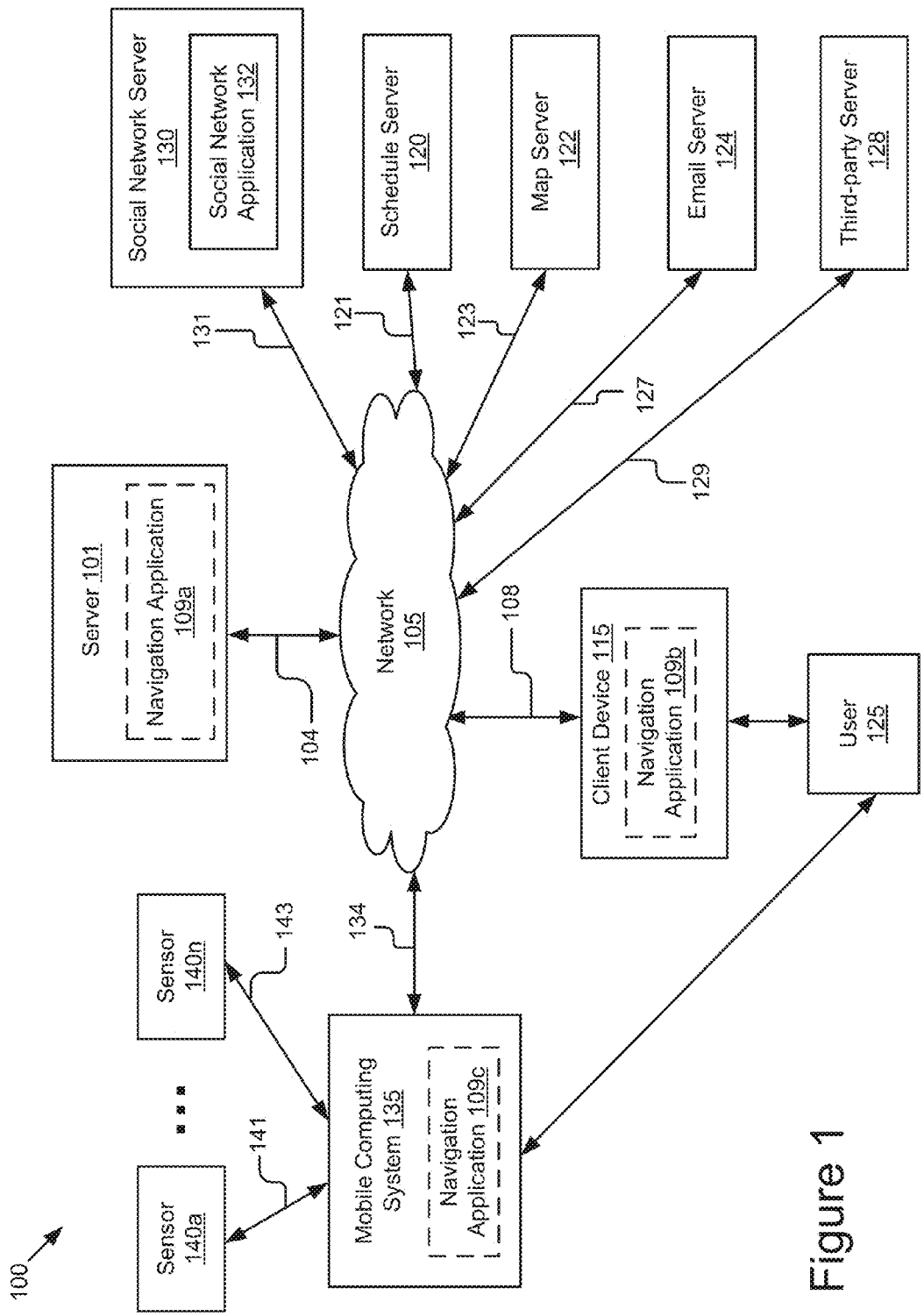
FIG. 1 is a block diagram illustrating an example system for estimating journey destinations based on crowd-sourced popularity factors.

FIG. 1 illustrates a block diagram of an example system 100 for estimating journey destinations based on crowd-sourced popularity factors according to some embodiments. The illustrated system 100 includes a server 101, a mobile computing system 135, a client device 115, an email server 124, a map server 122, a schedule server 120, a third-party server 128 and a social network server 130. The entities of the system 100 are communicatively coupled via a network 105.

The network 105 can be a conventional type, wired or wireless, and may have numerous different configurations including a star configuration, token ring configuration or other configurations. Furthermore, the network 105 may include one or more local area networks (LAN), wide area networks (WAN) (e.g., the Internet), public networks, private networks, virtual networks, and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the server 101, the mobile computing system 135, the client device 115, the email server 124, the map server 122, the schedule server 120, the third-party server 128 and the social network server 130, in practice one or more networks 105 can be connected to these entities.

In some embodiments, the navigation application 109a can be operable on the server 101, which is coupled to the network 105 via signal line 104. The server 101 can be a hardware and/or virtual server that includes a processor, a memory and network communication capabilities. In some embodiments, the server 101 can send and receive data to and from one or more of the email server 124, the social network server 130, the schedule server 120, the client device 115, the map server 122 and the mobile computing system 135. Although FIG. 1 illustrates one server 101, the system 100 can include one or more servers 101.

In some embodiments, the navigation application 109b can be operable on the client device 115, which is connected to the network 105 via signal line 108. In some embodiments, the client device 115 can send and receive data to and from one or more of the server 101, the social network server 130, the schedule server 120, the map server 122, the email server 124 and the mobile computing system 135. The client device 115 can be a computing device that includes a memory and a processor, for example a laptop computer, a desktop computer, a tablet computer, a mobile telephone, a personal digital assistant (PDA), a mobile email device or any other electronic device capable of processing information and accessing a network 105. In some embodiments, the user 125 can interact with the client device 115. Although FIG. 1 illustrates one client device 115, the system 100 can include one or more client devices 115.

In some examples, the navigation application 109b can act in part as a thin-client application that may be stored on the client device 115 and in part as components that may be stored on one or more of the server 101 and the mobile computing system 135. For example, the server 101 can store journey destinations estimated for a user and generate graphical data for providing a user interface that depicts the journey destinations. The navigation application 109b can send instructions to a browser (not shown) included with the navigation application 109b and/or installed on the client device 115 to present the user interface on a display device (not shown) coupled to the client device 115.

In some embodiments, the navigation application 109c can be operable on a mobile computing system 135, which is coupled to the network 105 via signal line 134. In some embodiments, the mobile computing system 135 can send and receive data to and from one or more of the server 101, the social network server 130, the schedule server 120, the map server 122, the email server 124 and the client device 115. The mobile computing system 135 can be any computing device that includes a memory and a processor. In some embodiments, the mobile computing system 135 can be a vehicle, an automobile, a bus, a bionic implant or any other mobile system with non-transitory computer electronics (e.g., a processor, a memory or any combination of non-transitory computer electronics). In some embodiments, the mobile computing system 135 includes a laptop computer, a tablet computer, a mobile phone or any other mobile device capable of accessing a network 105. A user 125 can interact with the mobile computing system 135. In some examples, a user 125 can be a driver driving a vehicle or a passenger sitting on a passenger seat. Although FIG. 1 illustrates one mobile computing system 135, the system 100 can include one or more mobile computing systems 135.

The navigation application 109 can include logic for providing estimated journey destinations to a user. In some embodiments, the navigation application 109 can be implemented using hardware including a field-programmable gate array (FPGA), an application-specific integrated circuit (ASIC), software executable by a processor of a computer device, a combination of hardware and software, etc. In some embodiments, the navigation application 109 may be stored in and distributed across a combination of the devices and servers, or in one of the devices or servers. The navigation application 109 is described below in more detail with reference to at least FIGS. 2-8C.

One or more sensors 140a . . . 140n can be coupled to the mobile computing system 135. For example, the sensor 140a is communicatively coupled to the mobile computing system 135 via signal line 141. The sensor 140n is communicatively coupled to the mobile computing system 135 via signal line 143. The sensor 140 can be a device that can measure one or more physical and/or dynamic parameters. For example, the sensor 140 can measure at least one or more of a current gas mileage, engine on or off in a vehicle, a parking break, a speed, a time of the day, a location (e.g., a latitude, longitude and altitude of the location), system safety parameters related to a vehicle (e.g., an airbag system, an anti-lock braking system, etc.), a distance from the vehicle to other objects (e.g., roadside structure, traffic lights, etc.), a distance from the vehicle to nearby vehicles, an acceleration of the vehicle, a direction of travel, a fuel tank level, a battery charge level, temperature, humidity and/or any other physical parameters associated with a vehicle. In some embodiments, the sensor 140 can be one of a global positioning system (GPS) sensor, a camera, an on-board diagnostics (OBD) system, an engine control unit (ECU, PCM, etc.), or any other type of sensors. In some embodiments, the sensors 140 can be sensors installed in the mobile computing system 135 such as a vehicle.

The social network server 130 can be a hardware and/or virtual server that includes a processor, a memory and network communication capabilities. The social network server 130 is coupled to the network 105 via signal line 131. In some embodiments, the social network server 130 can send and receive data to and from one or more of the client device 115, the server 101, the mobile computing system 135, the schedule server 120, the map server 122 and the email server 124 via the network 105. The social network server 130 may include a social network application 132. A social network can be a type of social structure where the users may be connected by a common feature. The common feature can include relationships/connections, e.g., friendship, family, work, an interest, etc. In some examples, the common feature may include explicitly defined relationships and relationships implied by social connections with other online users. In some examples, relationships between users in a social network can be represented using a social graph, email graph, or other collection of data that describes a mapping of the users in the social network and how the users are related to each other in the social network.

Although FIG. 1 includes one social network provided by the social network server 130 and the social network application 132, the system 100 may include multiple social networks provided by other social network servers and other social network applications.

The schedule server 120 can be a hardware and/or virtual server that includes a processor, a memory and network communication capabilities. In some embodiments, the schedule server 120 can manage and synchronize schedule data describing a user's calendar schedule, contacts, etc. For instance, the schedule server 120 may provide a web-based calendar service (e.g., Google Calendar™). In some embodiments, the schedule server 120 can receive data describing a request for a user's calendar schedule from one or more of the server 101, the client device 115 and the mobile computing system 135. The schedule server 120 can retrieve data describing the user's calendar schedule from a storage device (not shown) associated with the schedule server 120 with permission from the user. The schedule server 120 can send the user's calendar schedule to one or more of the server 101, the client device 115 and the mobile computing system 135 via the network 105. In some embodiments, the schedule server 120 is communicatively coupled to the network 105 via signal line 121. Although FIG. 1 includes one schedule server 120, the system 100 may include one or more schedule servers 120. In addition, while FIG. 1 depicts the schedule server 120 and email server 124 as monolithic entities, in further embodiments, various structure, acts, and/or functionality of these entities may be combined and/or integrated into the same computing device and/or system. For example, the schedule server 120 and the email server 124 may be a Microsoft Exchange Server.

The map server 122 can be a hardware and/or virtual server that includes a processor, a memory and network communication capabilities. In some embodiments, the map server 122 can receive and send data to and from one or more of the server 101, the social network server 130, the client device 115 and the mobile computing system 135. For example, the map server 122 can send data describing a map to the navigation application 109. The map data may, in some cases, be pushed to the navigation application 109 or may be provided to the navigation application 109 upon request. The map data may be provided by the map server 122 incrementally based on a region being mapped by the navigation application 109 or may be provided in bulk. The map server 122 is communicatively coupled to the network 105 via signal line 123. Although FIG. 1 includes one map server 122, the system 100 may include one or more map servers 122.

The email server 124 can be a hardware and/or virtual server that includes a processor, a memory and network communication capabilities. In some embodiments, the email server 124 can receive and send data to and from one or more of the server 101, the client device 115 and the mobile computing system 135. For example, the email server 124 can send a user's email content to the navigation application 109 with permission from the user, so that the navigation application 109 may determine the user's schedule based on the email content. For example, the email server 124 may include a webmail server, a Microsoft Exchange™ Server, etc. In some instances, the email server 124 may provide the email data using standard protocols or proprietary protocols. For instance, the email server 124 may provide the email data via POP3, IMAP, WebDav, MAPI, etc. The email server 124 is communicatively coupled to the network 105 via signal line 127. Although FIG. 1 includes one email server 124, the system 100 may include one or more email servers 124.

The third-party server 128 can be a hardware and/or virtual server that includes a processor, a memory and network communication capabilities. The third-party server 128 is communicatively coupled to the network 105 via signal line 129. In some embodiments, the third-party server 128 can receive and send data to and from one or more of the server 101, the client device 115 and the mobile computing system 135. For example, the third-party server 128 can aggregate weather information and/or traffic information associated with various locations. Upon receiving a request for the information from the navigation application 109, the third-party server 128 can provide the weather information and/or traffic information associated with the user's current location to the navigation application 109. It should be understood that the third-party server 128 may also provide other information to the navigation application 109.

Example Navigation Application

Figure 2:
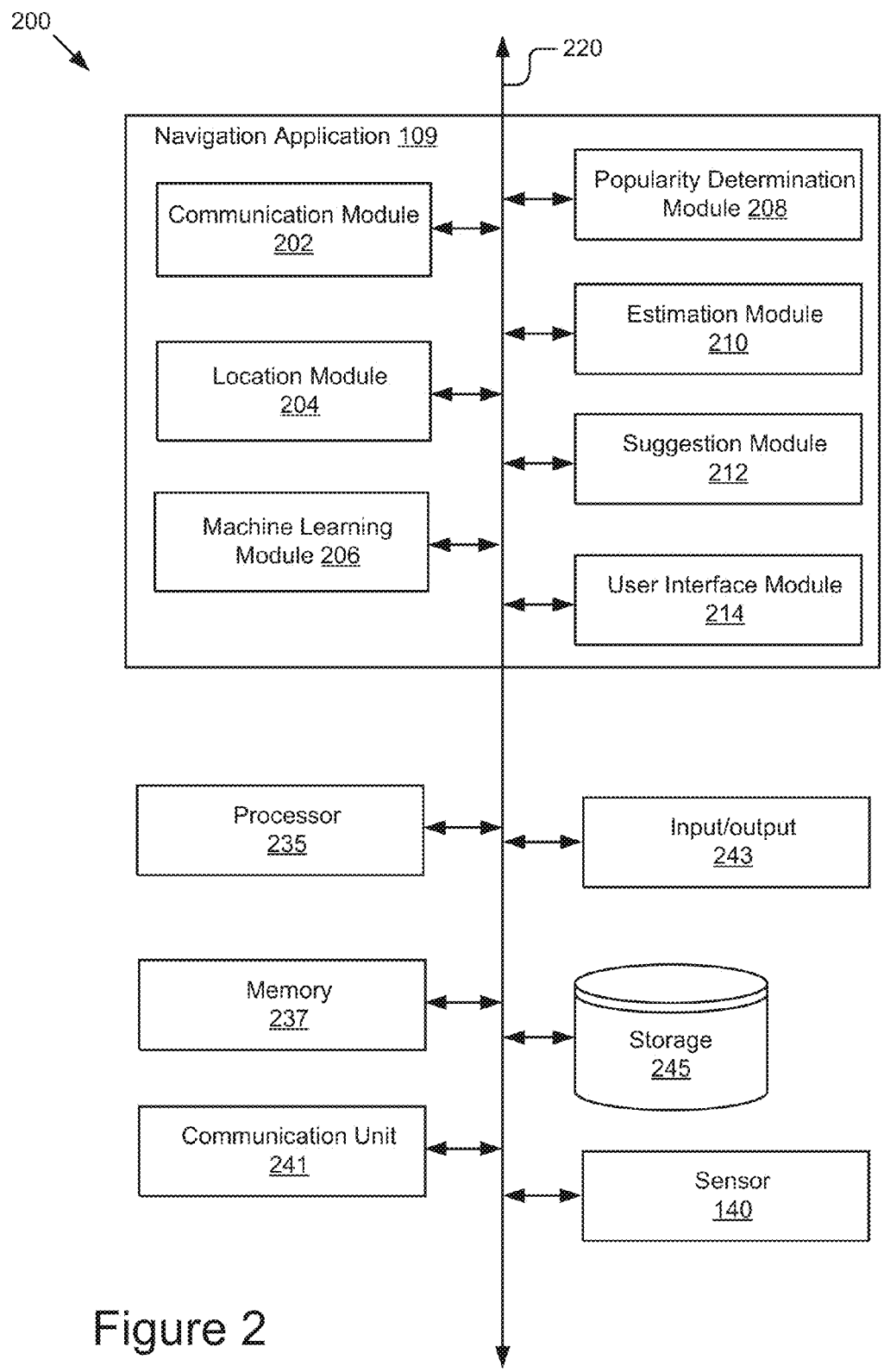
FIG. 2 is a block diagram illustrating an example computing device having an example navigation application.

Referring now to FIG. 2, an example computing device 200 having an example navigation application 109 is shown in more detail. FIG. 2 is a block diagram of a computing device 200 that includes a navigation application 109, a processor 235, a memory 237, a communication unit 241, an input/output device 243, a storage device 245 and a sensor 140 according to some embodiments. The components of the computing device 200 are communicatively coupled by a bus 220. The bus 220 can be any type of conventional communication bus for transferring data between components of a computing device, or between computing devices. In various embodiments, the computing device 200 may be a server 101, a client device 115 or a mobile computing system 135.

The processor 235 can include one or more processing units, such as an arithmetic logic unit, a microprocessor, a general purpose controller or some other processor array to perform computations and provide electronic display signals to a display device. Processor 235 can process data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 can include one or more non-transitory computer-readable media for storing instructions and/or data that can be executed by the processor 235. The instructions and/or data may include code for performing the techniques described herein. In some embodiments, the memory 237 can store the navigation application 109. The memory 237 may include a dynamic random access memory (DRAM) device, a static random access memory (SRAM) device, embedded memory, flash memory, or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from one or more of the server 101, the mobile computing system 135 and the client device 115 depending upon where the navigation application 109 is stored. The communication unit 241 may be coupled (wiredly, wirelessly, etc.) to the network 105 to communicate with other entities forming the network 105. In some embodiments, the communication unit 241 may include one or more ports for direct physical connection to the network 105 or to another communication channel. For example, the communication unit 241 may include a USB, SD, CAT-5 or similar port for wired communication with the client device 115. In some embodiments, the communication unit 241 may include a wireless transceiver for exchanging data with the client device 115 or other communication channels using one or more wireless communication methods, including IEEE 802.11, IEEE 802.16, BLUETOOTH®, dedicated short-range communications (DSRC) or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 245 can be a non-transitory storage medium that stores data for providing the structure, acts and/or functionality described herein. In some embodiments, the storage device 245 may include a database management system (DBMS) for storing and providing access to data. The storage device 245 may include solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information.

In some embodiments, the storage device 245 can store one or more of social network data, location data, data describing user schedules, data describing user preferences, crowd-sourced popularity factors, popularity scores, one or more popular destinations, one or more destination regions, one or more refined destinations, travel suggestions to one or more destinations, etc. The data stored in the storage device 245 is described below in more detail. In some embodiments, the storage device 245 may store other data for providing the structure, acts and/or functionality described herein.

In some embodiments, the navigation application 109 includes a communication module 202, a location module 204, a machine learning module 206, a popularity determination module 208, an estimation module 210, a suggestion module 212 and a user interface module 214. These components of the navigation application 109 are communicatively coupled via the bus 220.

The communication module 202 can be software and/or logic for handling communications between the navigation application 109 and other components of the computing device 200. In some embodiments, the communication module 202 can be a set of instructions executable by the processor 235 to provide the structure, acts and/or functionality described below for handling communications between the navigation application 109 and other components of the computing device 200. In some embodiments, the communication module 202 can be stored in the memory 237 of the computing device 200 and can be accessible and executable by the processor 235. The communication module 202 may be adapted for cooperation and communication with the processor 235 and other components of the computing device 200.

The communication module 202 can send and receive data, via the communication unit 241, to and from one or more of the client device 115, the social network server 130, the server 101, the schedule server 120, the map server 122, the email server 124 and the mobile computing system 135 depending upon where the navigation application 109 is stored. For example, the communication module 202 can receive, via the communication unit 241, schedule data from the schedule server 120 and send the schedule data to the popularity determination module 208. In another example, the communication module 202 can receive graphical data for providing a user interface to a user from the user interface module 214 and send the graphical data to the client device 115 or the mobile computing system 135, causing the client device 115 or the mobile computing system 135 to present the user interface to the user.

In some embodiments, the communication module 202 can receive data from other components of the navigation application 109 and store the data in the storage device 245. For example, the communication module 202 can receive graphical data from the user interface module 214 and store the graphical data in the storage device 245. In some embodiments, the communication module 202 can retrieve data from the storage device 245 and send the retrieved data to other components of the navigation application 109. For example, the communication module 202 can retrieve data describing popularity scores for potential destinations from the storage 245 and sends the data to the estimation module 210.

The location module 204 can be software and/or logic for determining a current route associated with a user. In some embodiments, the location module 204 can be a set of instructions executable by the processor 235 to provide the structure, acts and/or functionality described below for determining a current route associated with a user. In some embodiments, the location module 204 can be stored in the memory 237 of the computing device 200 and can be accessible and executable by the processor 235. The location module 204 may be adapted for cooperation and communication with the processor 235 and other components of the computing device 200.

The location module 204 can receive location data from one or more sensors 140 and/or the storage 245, and determine a current location associated with a user based on the location data. For example, the location module 204 can receive GPS data from a GPS sensor or a GPS application and determine the location of the user's computing device based on the GPS data. In another example, the location data may include an IP address associated with the computing device, signaling information transmitted between the computing device and a cellular network, or other location-related data, and the location module 204 is capable of determining an approximate geolocation using this location data. For instance, the location module 204 can cross-reference the IP address with other information sources, such as internet server provider databases, internet registries, etc. to determine the geographic location, or the location module 204 may use multilateration or triangulation to determine the geographic location.

The location module 204 can also determine a current travel direction associated with the user based on the location data. For example, the location module 204 can determine that the user is travelling in a north direction based on the location data (e.g., GPS data, signaling information, etc.). In another example, the location module 204 can determine that the user takes a right turn at an intersection of a road.

The location module 204 can determine a current route associated with the user based on the user's current location, the user's current travel direction and/or other location data received from the sensors 140, the computing device 200, and/or the storage 245, etc. For example, if the user's current location is on a highway and the current travel direction is heading north, the location module 204 can determine the user's current route as traveling in northbound on the highway between two given exits. In some embodiments, the current route may include the user's current location, the current travel direction and a travel path from a journey start point to the user's current location.

In some embodiments, the location module 204 can determine that the user is traveling toward a destination region or a refined destination within a destination region based on location data received from a sensor 140, the computing device 200, and/or the storage 245, etc. For example, the location module 204 can determine that the user is traveling toward a particular destination region or a refined destination within a particular destination region based on GPS data received from a GPS sensor, signaling information received via a cellular transceiver on the computing device 200, etc. The destination region and the refined destination are described below in more detail.

In some embodiments, the location module 204 can send data describing the user's current route to the machine learning module 206, the popularity determination module 208, the estimation module 210, the suggestion module 212, and/or the user interface module 214. In some additional embodiments, the location module 204 can store data describing the user's current route in the storage 245.

The machine learning module 206 can be software and/or logic for estimating a destination for a user using machine learning techniques. In some embodiments, the machine learning module 206 can be a set of instructions executable by the processor 235 to provide the structure, acts and/or functionality described below for estimating a destination for a user using machine learning techniques. In some embodiments, the machine learning module 206 can be stored in the memory 237 of the computing device 200 and can be accessible and executable by the processor 235. The machine learning module 206 may be adapted for cooperation and communication with the processor 235 and other components of the computing device 200.

The machine learning module 206 can retrieve data describing a user's journey history from the mobile computing system 135 and/or the client device 115 via the communication module 202 and the communication unit 241. A journey history associated with a user may include data describing one or more of: historical journeys taken by the user in the past; frequencies of the historical journeys (e.g., the user taking a particular journey every day, every week or every month, etc.); journey start points; journey end points; journey start times; journey end times; journey durations; journey routes; and other passengers on the journeys, etc. In additional embodiments, a journey history associated with a user may include other example data associated with the user's journeys.

The machine learning module 206 can estimate a journey destination for the user using machine learning techniques based on the user's journey history. For example, the machine learning module 206 can apply machine learning techniques to estimate a journey destination for the user based on frequencies of the historical journeys, the time of the day, the day of the week and/or the user's current location, etc., at the start of a journey. Example machine learning techniques include, but are not limited to, artificial neural networks, Bayesian networks, decision tree learning, etc.

The popularity determination module 208 can be software and/or logic for determining one or more popularity factors and/or a popularity score for a potential destination. In some embodiments, the popularity determination module 208 can be a set of instructions executable by the processor 235 to provide the structure, acts and/or functionality described below for determining one or more popularity factors and/or a popularity score for a potential destination. In some embodiments, the popularity determination module 208 can be stored in the memory 237 of the computing device 200 and can be accessible and executable by the processor 235. The popularity determination module 208 may be adapted for cooperation and communication with the processor 235 and other components of the computing device 200.

The popularity determination module 208 can receive data describing a user's current route from the location module 204 and/or the storage 245. The popularity determination module 208 can determine a set of potential destinations based on the current route. For example, the popularity determination module 208 can determine a set of potential destinations along the user's current route. The popularity determination module 208 can determine one or more crowd-sourced popularity factors for each potential destination as described below in more detail.

A crowd-sourced popularity factor can be data used to determine a popularity of a destination. Example crowd-sourced popularity factors for a destination can include, but are not limited to, a number of people that have visited the destination, a number of people that have checked in at the destination using an application, calendar of events at the destination, a number of people that are currently at the destination (e.g., based on their location data, schedule data, messaging data, etc.), a capacity of the destination (e.g., the number of people possibly accommodated by the destination), the time of the day, the day of the week, whether the day is a holiday, weather conditions, etc. Other example crowd-sourced popularity factors are possible.

In some embodiments, the popularity determination module 208 can determine an overall popularity for a potential destination based on the number of total visits to the potential destination in comparison to the numbers of total visits to other destinations (e.g., within a certain proximity, generally, etc.). The overall popularity may describe an overview of popularity of a potential destination among different users. The popularity determination module 208 can determine a variable popularity for the potential destination as a function of one or more temporal variables (e.g., the time of the day, the day of the week, the date, whether the day is a holiday, etc.) and other variables (e.g., weather condition, whether there is an event at the destination, etc.).

In some implementations, geolocation data may be continuously, iteratively, etc., aggregated from cellular providers, network providers, analytics services, instances of the navigation application 109, client devices 115, mobile computing devices, etc., by the server 101, and analyzed by the popularity determination module 208 or another component of the system 100 to determine visitor trends to various locations over time, including real-time data describing how many visitors are currently at a given destination. The popularity determination in some cases can be based at least in part on data describing user ratings, opinions, etc., for various destinations aggregated from review, travel, social networking, etc., services hosted on computing devices coupled to the network (e.g., the social network server 130, a third-party server 128, etc.). Representative services may include, but are not limited to, TripAdvisor, Frommers, Yelp, Google+, Expedia, FaceBook, Twitter, etc. This data may be used by the popularity determination module 208 to determine which locations are trending, which locations are becoming less popular, generate an overall popularity score, etc.

The popularity determination module 208 can determine a destination saturation level for a potential destination. The saturation level can quantify the available capacity the destination has at a given point in time. In some implementations, the saturation level may be determined by the popularity determination module 208 as a function of: (1) the time of the day; and/or (2) a capacity of the potential destination (e.g., the total number of people that are possibly accommodated by the destination location) versus the actual number of people that are currently at the destination location. For example, assume it is half an hour before a beginning of a sport event at a stadium. If the number of people that are currently at the stadium has almost reached the capacity of the stadium, the popularity determination module 208 can determine that the destination saturation level for the stadium is near maximum and that not many other users are likely to travel to the stadium. If the number of people that are currently at the stadium has reached merely 40% of the capacity of the stadium, the popularity determination module 208 may determine that the destination saturation level for the stadium is low and a large number of other users may be likely to travel to the stadium.

The popularity determination module 208 can determine a schedule popularity for the potential destination based on the user's explicit and/or implicit schedule data. For example, assume the time of the day is 6:30 PM and the user's schedule data indicates the user has a dinner appointment at home from 7:00 PM to 9:00 PM. The popularity determination module 208 can generate a lower schedule popularity for potential destinations along the user's current route than the "home" destination; however, if the user's schedule data indicates the user does not have any schedules after 6:30 PM, the popularity determination module 208 may generate a higher schedule popularity for restaurants along the user's current route than other destinations along the user's current route.

In some embodiments, the popularity determination module 208 can determine a popularity score for a potential destination based on one or more crowd-sourced popularity factors. For example, the popularity determination module 208 can determine a popularity score for a potential destination based at least on one or more of: (1) the overall popularity of the potential destination; (2) the variable popularity of the potential destination; (3) the destination saturation level of the potential destination; and (4) the schedule popularity of the potential destination. In a further example, the popularity determination module 208 can determine a higher popularity score for a potential destination than other potential destinations if the overall popularity, the variable popularity and/or the schedule popularity of the potential destination are higher than the other potential destinations. In another example, the popularity determination module 208 can determine a higher popularity score for a potential destination than other destinations, if the destination saturation level of the potential destination indicates that the number of people currently at the destination location almost reaches the capacity of the destination location; however, as described herein, the estimation module 212 may not select the potential destination as a popular destination estimation for other users since the destination is substantially saturated and not many other users are likely to travel to the destination.

In some further examples, the popularity determination module 208 can determine the popularity score for the potential destination using location data, schedule data, popularity-related data (e.g., crowd-sourced data), weather data, traffic data, and or other available data and based at least on one or more of: (1) the number of people that have visited the destination location; (2) the number of people that have checked in the destination location; (3) the destination location's calendar of events; (4) the number of people that are currently at the destination location; (5) the time of the day; (6) the day of the week; (7) whether the day is a holiday; (8) weather conditions; (9) traffic information; (10) the user's explicit schedule data (e.g., the user's calendar events); (11) the user's implicit schedule data (e.g., email confirmation of airline, train, shuttle or ship tickets); (12) the user's social network data (e.g., posts, acknowledgements, comments, sharings, etc.); and (13) the user's preferences.

For example, the popularity determination module 208 may generate a high popularity score for an office complex relative to other destinations when the time of the day is rush hours in the morning; however, after rush hours, the popularity determination module 208 may generate a low popularity score for the office complex relative to other destinations. In another example, if the time of the day is lunch time or dinner time, the popularity determination module 208 may generate a higher popularity score for a restaurant along the user's current route than other destinations along the user's current route; however, if the time of the day indicates it is not a good time to eat, the popularity determination module 208 may generate a lower popularity score for the restaurant than other destinations.

In some embodiments, at each intersection of the user's current route, the popularity determination module 208 can estimate an arriving probability for each potential destination and weigh the arriving probability according to one or more crowd-sourced popularity factors of the potential destination. An arriving probability from an intersection to a potential destination can describe a probability that the user may travel to the potential destination from that intersection. For example, the popularity determination module 208 can estimate and weigh the arriving probability for the potential destination based on the time of the day, the day of the week, weather conditions, the number of people going to the potential destination, calendar of events at the potential destination, a destination saturation level of the potential destination (e.g. a ratio between the number of people currently at the potential destination and the capacity of the potential destination), etc. An arriving probability associated with a potential destination can be included in a popularity score quantifying the popularity associated with the potential destination.

In some embodiments, the popularity determination module 208 can send data describing one or more popularity scores for one or more potential destinations to the estimation module 210. In some additional embodiments, the popularity determination module 208 can store data describing the one or more popularity scores in the storage 245.

The estimation module 210 can be software and/or logic for determining one or more destination estimations for a user. In some embodiments, the estimation module 210 can be a set of instructions executable by the processor 235 to provide the structure, acts and/or functionality described below for determining one or more destination estimations for a user. In some embodiments, the estimation module 210 can be stored in the memory 237 of the computing device 200 and can be accessible and executable by the processor 235. The estimation module 210 may be adapted for cooperation and communication with the processor 235 and other components of the computing device 200.

A destination estimation can be an estimate of a journey destination that a user would be interested in receiving. A destination estimation can include a destination region, a refined destination region within a particular destination region, and/or a particular popular destination. Other variations are also possible. A user may be interested in various destinations for a variety of reasons, including because of their popularity (e.g., notoriety, esteem, public interest in, desirability, interestingness, uniqueness, value, etc.), their availability, their convenience, the user has a preference for them, a combination of the foregoing, etc.

The estimation module 210 can receive data describing popularity scores, saturation levels, and/or user preferences associated with a set of potential destinations from the popularity determination module 208 and/or the storage 245. Based on the popularity scores, saturation levels, and/or user preferences, the estimation module 210 can estimate which destinations along the user's current route from the set of potential destinations would be popular, interesting, etc., to the user. For example, the estimation module 210 can determine a plurality of popular destinations that have corresponding popularity scores greater than a predetermined threshold.

In some embodiments, the estimation module 210 can determine a destination estimation for the user based at least in part on the destination's popularity score. For example, a nearby destination may reflect an imminent or ongoing event, and the destination's popularity score may reflect that all or many of the user's friends are talking about attending the event (e.g., based on the user's social data). Based on the popularity score (e.g., one or more of the crowd-sourced popularity factors), the estimation module 210 may include the destination as an estimate.

In some embodiments, the estimation module 210 can determine a destination for the user based at least in part on the destination's popularity score and a user preference. For example, if a nearby place is hosting a popular concert, the popularity determination module 208 may generate a high popularity score for the nearby place relative to other destinations. However, if a profile of the user indicates that the user would not be not interested in the popular concert or the user expressly indicates such (e.g., using a prompt provided by the navigation application 109), the estimation module 210 may not determine the nearby place as a destination estimation for the user. In another example, even if a nearby restaurant has a popular score lower than other restaurants, the estimation module 210 may determine the nearby restaurant as a destination estimation for the user because a profile of the user indicates that the user likes the type of food server by the restaurant or has frequented the restaurant in the past (e.g., based on profile data stored in the storage 245), or the user expressly indicates an interest in the restaurant (e.g., using a prompt provided by the navigation application 109).

In some embodiments, the estimation module 210 can determine a destination estimation for the user based at least in part on the popularity score and the destination saturation level. In some cases, the estimation module may select a destination as a destination estimate because both the designation's popularity score and saturation level satisfy certain thresholds. For example, a particular venue (e.g., a baseball game) may have a high popularity score relative to other nearby destinations because of the number of people in attendance. Accordingly, the venue's saturation level may reflect that the venue is at capacity or has limited available capacity. The estimation module may filter out the potential destination as a destination estimation for the user since the destination is substantially saturated. Alternatively, the estimation module may include the potential designation (e.g., a nightclub) as a destination estimation for the user because that is the place where all or most of the user's friends are congregating and trying to get into based on the popularity score and saturation level. In a further example, the popularity score may reflect that a particular attraction is consistently popular based on the number of visitors over time, and the saturation level may reflect that location is currently not busy (e.g., not overrun with tourists) relative to other days or times of day. Accordingly, the estimation module 210 may include the attraction as a destination estimation. It should be understood that, like all examples and embodiments described herein, the above embodiments are provided by way of example, and that numerous other possibilities and combinations for estimating destinations are applicable and contemplated.

In some embodiments, at each intersection of the user's current route, the estimation module 210 can receive data describing arriving probabilities for a set of potential destinations along the user's current route. The estimation module 210 can further determine popular, interesting, etc., destinations from the potential destinations based at least in part on the arriving probabilities of the potential destinations. For example, the estimation module 210 can determine a plurality of popular destinations for the user that have arriving probabilities satisfying (e.g., greater than) a predetermined threshold. In another example, the estimation module 210 can determine a plurality of popular destinations that have the highest arriving probabilities among all the destinations.

In some embodiments, the estimation module 210 can cluster the one or more popular destinations into one or more destination regions along the user's current route. A destination region can be a geographic region that includes one or more popular destinations. In some embodiments, the popular destinations that can be clustered into the same destination region may satisfy a distance constraint. For example, every two popular destinations within a destination region can have a distance between them that is less than a predetermined distance value. In another example, a distance between each popular destination and a center point of the destination region can be less than a predetermined distance value. Other example distance constraints are possible. Example destination regions are illustrated with reference to at least FIG. 9.

In some embodiments, the estimation module 210 can receive data describing that the user is traveling toward a particular destination region from the location module 204 and/or the storage 245. The estimation module 210 can estimate one or more refined destinations within the destination region based on the popularity scores (e.g., crowd-sourced popularity factors). For example, the estimation module 210 can instruct the popularity determination module 208 to determine: (1) a set of potential destinations within the destination region; and (2) popularity scores for the set of potential destinations, which can be determined based at least in part on the crowd-sourced popularity factors. Using the popularity scores, the estimation module 210 can determine one or more popular destinations within the destination region from the set of potential destinations, and estimate one or more refined destinations from the one or more popular destinations within the destination region.

In some embodiments, the one or more refined destinations can be one or more popular destinations within the destination region that have the certain popularity scores, such as the highest among all of the designations within the region, which are higher than a predetermined threshold, etc.

In some embodiments, the one or more refined destinations can be one or more refined destination regions. A refined destination region may be a sub-region of a particular destination region and may include one or more popular destinations within the sub-region. For example, the estimation module 210 can cluster the popular destinations within the destination region into one or more refined destination regions, where each refined destination region can be a sub-region of the destination region and include one or more popular destinations within the sub-region.

In some embodiments, the estimation module 210 can progressively (re)estimate and/or refine journey destination estimations as the user progresses (e.g., travels) along a given route. For example, the estimation module 210 can initially estimate one or more destination regions for the user based on the user's route. As the user progresses along and/or changes the route, the estimation module 210 can adjust the granularity of one or more of the journey destination region estimations based on the user's proximity to the region and the user's direction of travel (e.g., whether the user is traveling toward or away from the region). If the user is traveling toward one or more of the regions, the estimation module 210 can refine the predictions/estimations for those regions by identifying more specific destinations and/or refined sub-regions within those regions that would be of interest to the user. In a further example, based on the progress of the user's journey, the estimation module 210 can sequentially estimate the user's journey destinations as following: (1) the user is traveling to San Francisco; (2) the user is traveling to North Beach in San Francisco; (3) the user is traveling to Washington Square in North Beach, San Francisco; and (4) the user is traveling to Sts. Peter & Paul Church in Washington Square, North Beach, San Francisco. If the user is traveling away from the one or more of the predicted regions and/or specifies a destination location, the estimation module 210 may eliminate the region(s) and/or specific designation locations as a suggestion, combine one or more of the suggested regions and/or locations with adjoining regions, etc.

In some embodiments, the estimation module 210 can send data describing one or more destination estimations (e.g., popular destinations, destination regions, refined destination regions, or refined destinations, etc.) to the suggestion module 212. In some additional embodiments, the estimation module 210 can store the one or more destination estimations in the storage 245.

The suggestion module 212 can be software and/or logic for providing travel suggestions to a user. In some embodiments, the suggestion module 212 can be a set of instructions executable by the processor 235 to provide the structure, acts and/or functionality described herein for providing travel suggestions to a user. In some embodiments, the suggestion module 212 can be stored in the memory 237 of the computing device 200 and can be accessible and executable by the processor 235. The suggestion module 212 may be adapted for cooperation and communication with the processor 235 and other components of the computing device 200.

In some embodiments, the suggestion module 212 can receive data describing one or more destination estimations from the estimation module 210 and/or the storage 245, and generate travel suggestions for the user based on the one or more destination estimations. For example, the suggestion module 212 can generate travel suggestions that recommend the user to travel to either one of the popular destinations. The travel suggestions may include driving directions from the user's current location to each popular destination, pertinent information about each popular destination and/or rationale explaining why the popular destinations are recommended to the user, etc. The user can select, via a user interface, voice command, etc., to travel to a popular destination from the popular destinations being suggested, and the navigation application 109 can automatically provide turn-by-turn instructions on how to get to the destination as well as additional information about the destination (e.g., user reviews, friends who have visited, photographs and videos, virtual self-guided tours, etc.).

In some embodiments, the suggestion module 212 can receive data describing one or more estimated destination regions from the estimation module 210 and/or the storage 245, and generate travel suggestions for the user based on the one or more estimated destination regions. The travel suggestions may include driving directions from the user's current location to each destination region, popular destinations within each estimated destination region and/or rationale explaining why the estimated destination regions are being recommended to the user, etc. The user can select, via a user interface voice command, etc., to travel to a destination region from the destination regions and the navigation application 109 can automatically provide turn-by-turn instructions on how to get to that region as well as additional information about the region, including specific attractions that might be of interest to the user.

In some embodiments, the suggestion module 212 can receive data describing one or more refined destinations from the estimation module 210 and/or the storage 245, and generate travel suggestions for the user based on the one or more refined destinations. The travel suggestions may include driving directions from the user's current location to each refined destination, brief introduction about each refined destination and/or rationale explaining why the refined destinations are recommended to the user, etc. The user can select, via a user interface, voice command, etc., to travel to a refined destination from the refined destinations and the navigation application 109 can automatically provide turn-by-turn instructions on how to get to that destination and/or more information about destination as described at least above.

In some embodiments, the suggestion module 212 can provide the travel suggestions to the user via a voice and/or electronic message. For example, the suggestion module 212 can instruct the client device 115 or the mobile computing system 135 to play a voice message and/or display an electronic message that describes the travel suggestions. In some additional embodiments, the suggestion module 212 can provide the travel suggestions to the user via a user interface presented on a display device coupled to the client device 115 or the mobile computing system 135. For example, the suggestion module 212 can instruct the user interface module 214 to generate graphical data for providing a user interface to the user, where the user interface can depict the travel suggestions for selection by the user.

The user interface module 214 can be software and/or logic for generating graphical data for providing user interfaces to users. In some embodiments, the user interface module 214 can be a set of instructions executable by the processor 235 to provide the structure, acts and/or functionality described below for generating graphical data for providing user interfaces to users. In some embodiments, the user interface module 214 can be stored in the memory 237 of the computing device 200 and can be accessible and executable by the processor 235. The user interface module 214 may be adapted for cooperation and communication with the processor 235 and other components of the computing device 200.

In some embodiments, the user interface module 214 can generate graphical data for providing a user interface that presents one or more popular destinations, destination regions or refined destinations to a user. In some distributed embodiments, the user interface module 214 can send the graphical data to a client device 115 and/or a mobile computing system 135, causing the client device 115 and/or the mobile computing system 135 to present the user interface to the user on a display device. In some embodiments, the user interface module 214 can generate graphical data for providing a user interface that provides travel suggestions to a user. In some additional embodiments, the user interface module 214 can generate graphical data for providing a user interface that allows a user to, select a destination, find out additional information about a destination, rate a destination, provide feedback for a destination, etc. It should be understood that the user interface module 214 may generate graphical data for providing other user interfaces to users.

Methods

Figure 3:
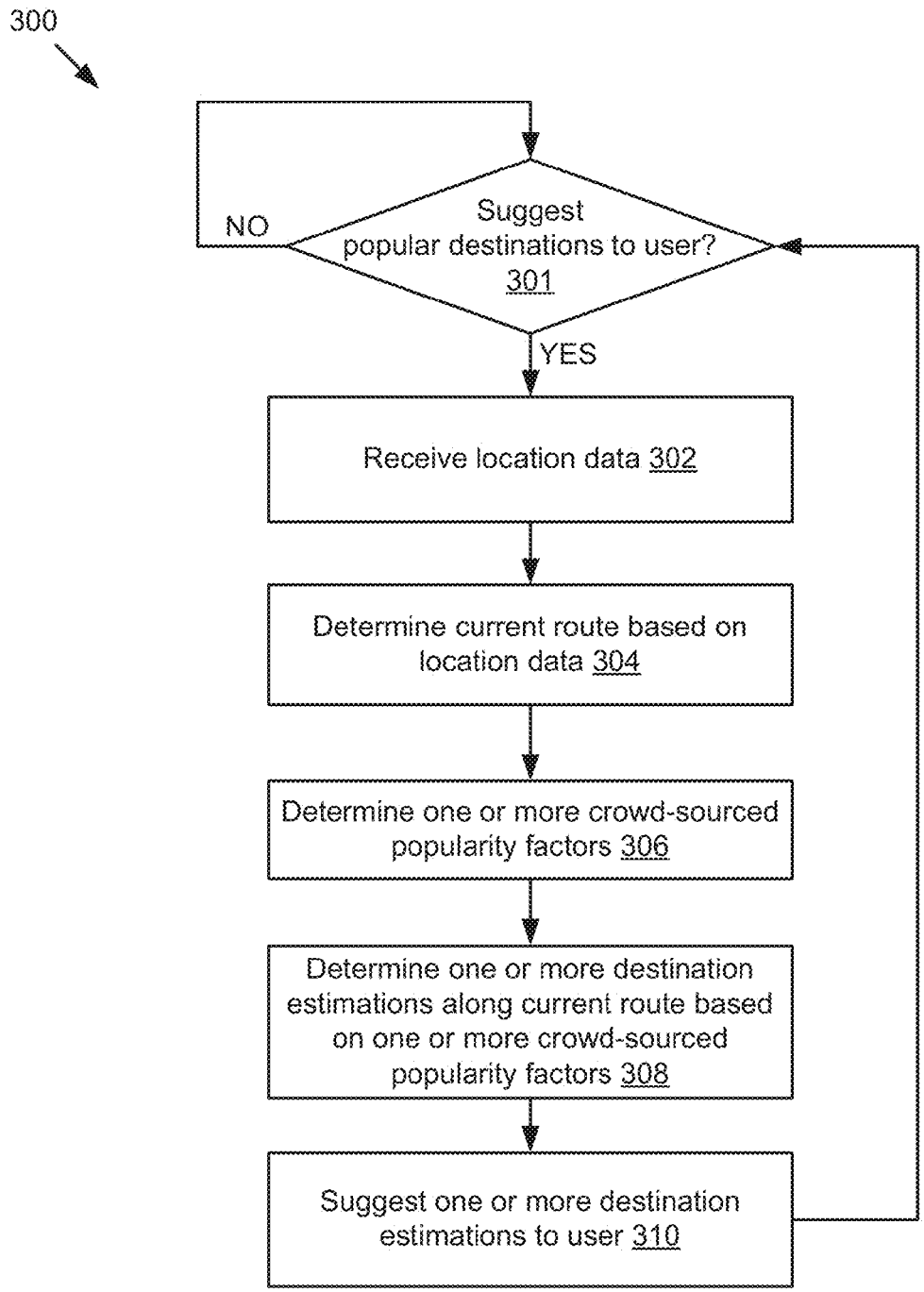
FIG. 3 is a flowchart of an example method for estimating journey destinations based on crowd-sourced popularity factors.

FIG. 3 is a flowchart of an example method 300 for estimating journey destinations based on crowd-sourced popularity factors. In some embodiments, the method 300 can determine 301 whether to suggest popular destinations to a user. If the method 300 determines to suggest popular destinations to the user, the method 300 can move to block 302. Otherwise, the method 300 can repeat operations at block 301, proceed to other operations, terminate, etc.

At block 302, the communication module 202 can receive location data from the sensor 140 and/or the storage 245. The location module 204 can determine 304 a current route associated with the user based on the location data. For example, the location module 204 can determine a current route based on GPS data received from a GPS sensor. The popularity determination module 208 can determine 306 one or more crowd-sourced popularity factors. An example method 306 for determining crowd-sourced popularity factors is illustrated below with reference to at least FIG. 7. The estimation module 210 can determine 308 one or more destination estimations along the current route based on the one or more crowd-sourced popularity factors. The one or more destination estimations can be one or more destination regions, refined destination regions, refined destinations within a destination region, one or more particular popular destinations, etc. The suggestion module 212 can suggest 310 the one or more destination estimations to the user, and the method 300 can move back to block 301.

Figure 4A:
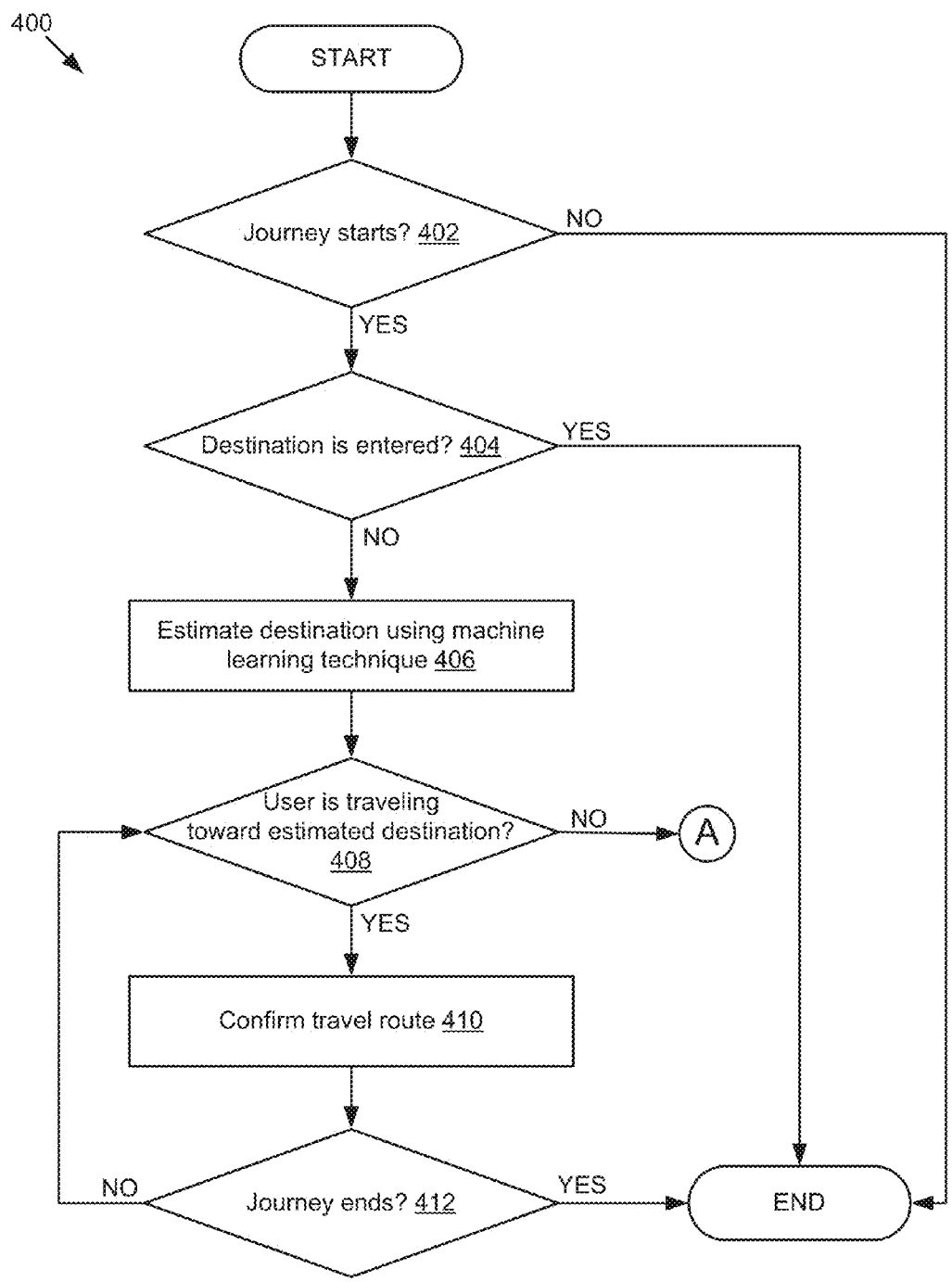
FIGS. 4A-4D are flowcharts of an example method for estimating journey destinations based on crowd-sourced popularity factors.

FIGS. 4A-4D are flowcharts of a further example method 400 for estimating journey destinations based on crowd-sourced popularity factors. Referring to FIG. 4A, the method 400 can determine 402 whether a journey starts. If the journey does not start, the method 400 can end or repeat. If the journey starts, the method can move to block 404. At block 404, the method 400 can determine whether a destination is entered for the journey. If the destination is already entered, the method 400 can end or repeat. Otherwise, the method 400 can move to block 406. At block 406, the machine learning module 206 can estimate a destination for the journey using machine learning techniques. The method 400 can determine whether 408 the user is traveling toward the estimated destination. If the user is traveling toward the estimated destination, the method 400 can move to block 410. Otherwise, the method 400 can move to block 414 in FIG. 4B. At block 410, the method 400 can confirm the user's travel route to the estimated destination. For example, the method 400 can highlight the user's route to the estimated destination. The method 400 can determine 412 whether the journey ends. If the journey ends, the method 400 ends or repeats. Otherwise, the method 400 can move back to block 408.

Figure 4B:
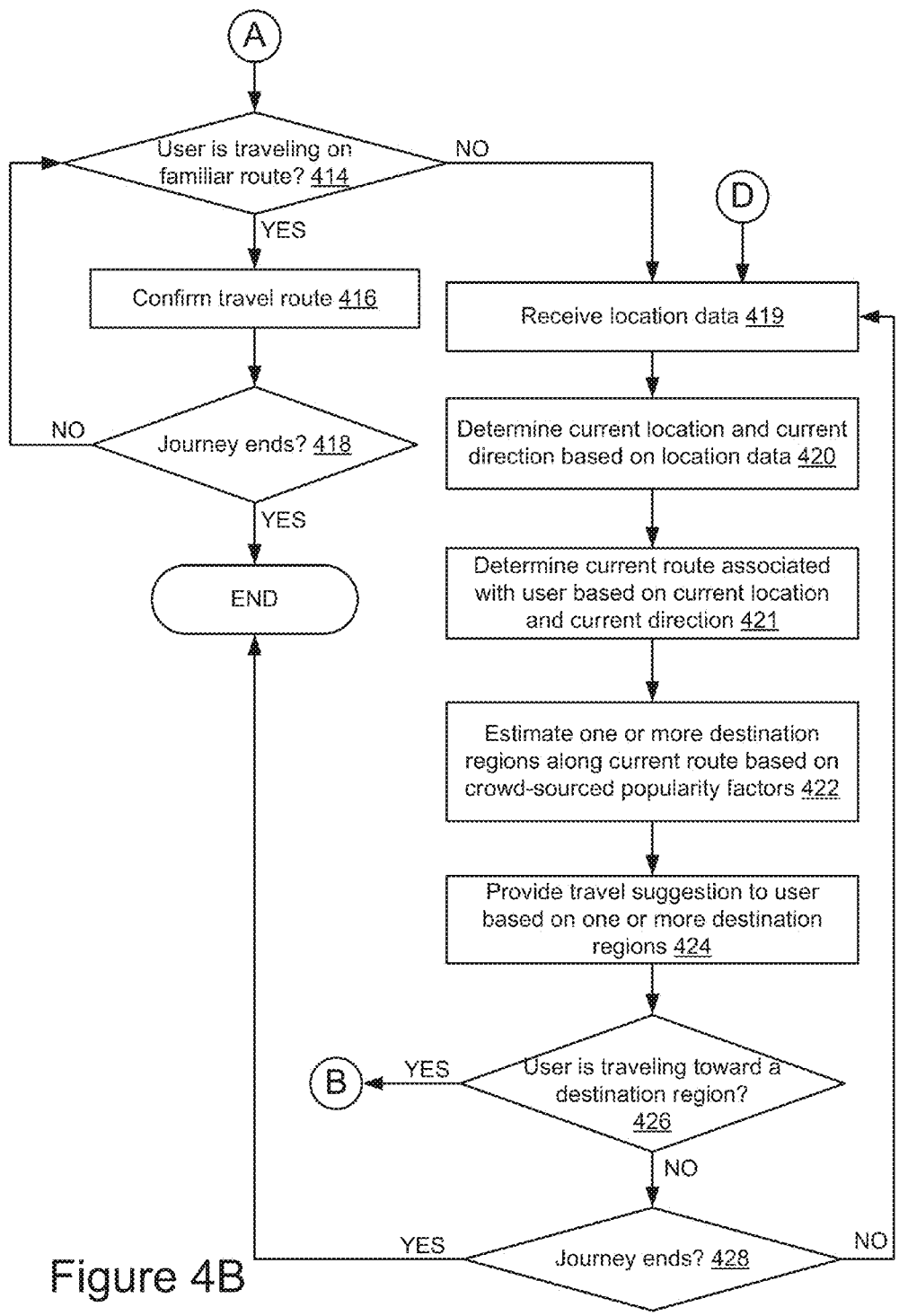

Referring to FIG. 4B, the method 400 can determine 414 whether the user is traveling on a familiar route. For example, the method 400 can determine whether the user is traveling on a route that he or she has taken before. In another example, the method 400 can determine whether the user is traveling on a familiar area. If the user is traveling on a familiar route, the method 400 can move to block 416. Otherwise, the method 400 can move to block 419. At block 416, the method 400 can confirm the user's travel route. For example, the method 400 can highlight the familiar route that the user is traveling on. The method 400 can determine 418 whether the journey ends. If the journey ends, the method 400 ends or repeats. Otherwise, the method 400 can move back to block 414.

At block 419, the communication module 202 can receive location data from the sensor 140 and/or the storage 245. The location module 204 can determine 420 a current location and a current direction associated with the user based on the location data. The location module 204 can determine 421 a current route associated with the user based on the current location and the current route. The estimation module 210 can estimate 422 one or more destination regions along the current route based on one or more crowd-sourced popularity factors. An example method for estimating one or more destination regions is illustrated with reference to at least FIGS. 5A and 5B. The suggestion module 212 can provide 424 travel suggestions to the user based on the one or more destination regions. The method 400 can determine 426 whether the user is traveling toward a destination region from the one or more destination regions. If the user is traveling toward a destination region, the method can move to block 430 in FIG. 4C. Otherwise, the method 400 can move to block 428. At block 428, the method 400 can determine whether the journey ends. If the journey ends, the method 400 ends or repeats. Otherwise, the method 400 can move to block 419.

Figure 4C:
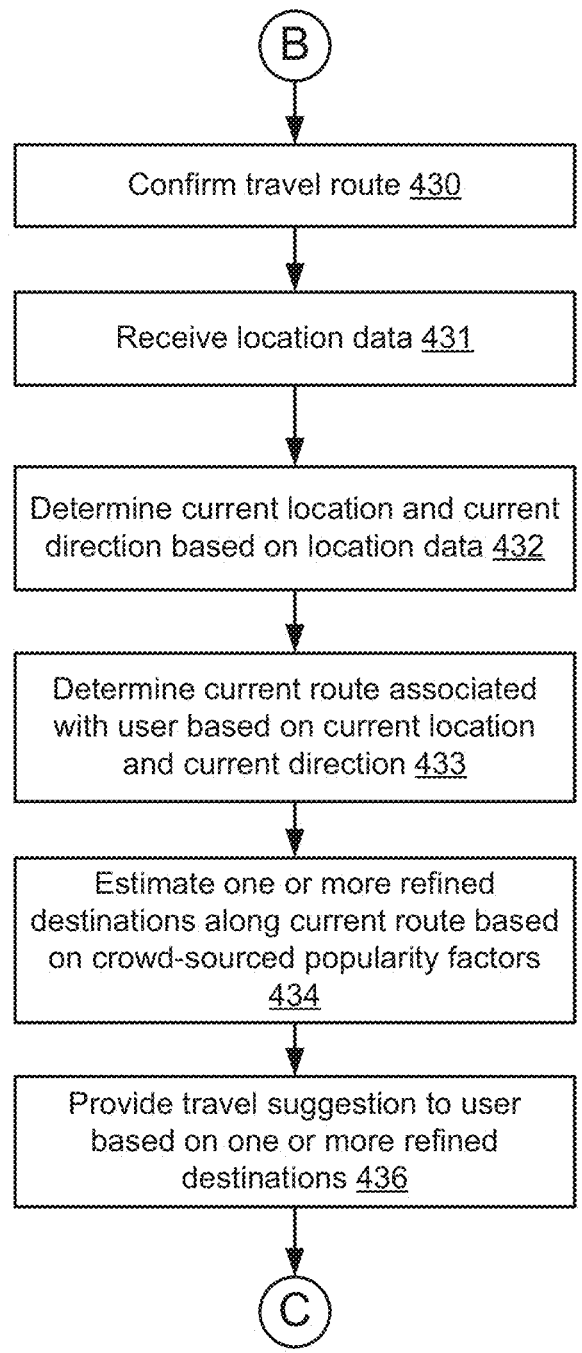

Referring to FIG. 4C, the method 400 can confirm 430 the user's travel route toward a destination region from the one or more destination regions. The communication module 202 can receive 431 location data from the sensor 140 and/or the storage 245. The location module 204 can determine 432 a current location and a current direction associated with the user based on the location data. The location module 204 can determine 433 a current route associated with the user based on the current location and the current direction. The estimation module 210 can estimate 434 one or more refined destinations within the destination region along the current route based on one or more crowd-sourced popularity factors. An example method for estimating one or more refined destinations is illustrated with reference to at least FIGS. 6A and 6B. The suggestion module 212 can provide 436 travel suggestions to the user based on the one or more refined destinations.

Figure 4D:
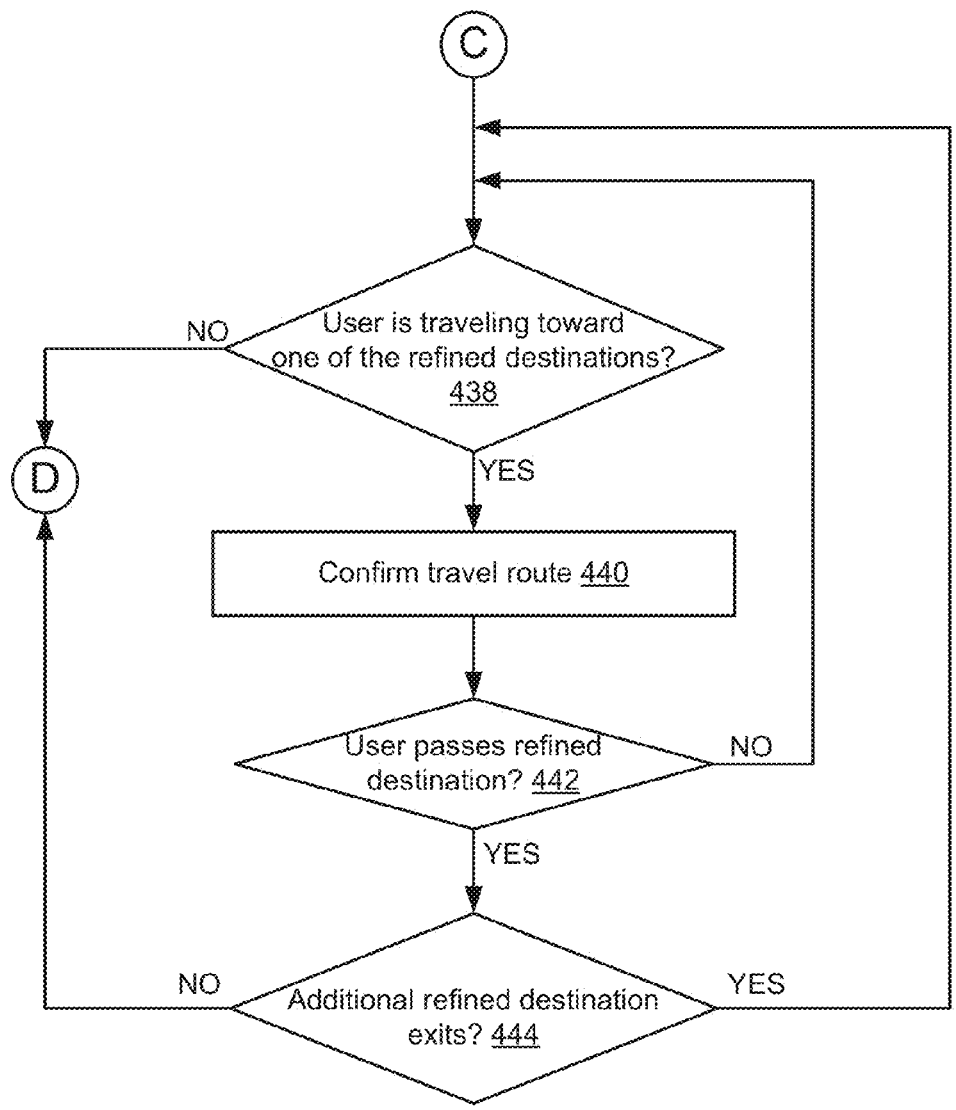

Referring to FIG. 4D, the method 400 can determine 438 whether the user is traveling toward one of the refined destinations. If the user is traveling toward one of the refined destinations, the method 400 can move to block 440. Otherwise, the method 400 can move to block 419 in FIG. 4B. At block 440, the method 400 can confirm the user's travel route toward the refined destination. The method 400 can determine 442 whether the user passes the refined destination. If the user already passes the refined destination, the method 400 can move to block 444. Otherwise, the method 400 can move to block 438. At block 444, the method 400 can determine whether any additional refined destination exists. If there is at least one additional refined destination, the method 400 can move to block 438. Otherwise, the method 400 can move to block 419 in FIG. 4B. In some embodiments, the operations of blocks 438-444 may be performed by the estimation module 210 in cooperation with one or more of the other modules of the navigation application 109, such as the location module 204, as discussed elsewhere herein.

Figure 5A:
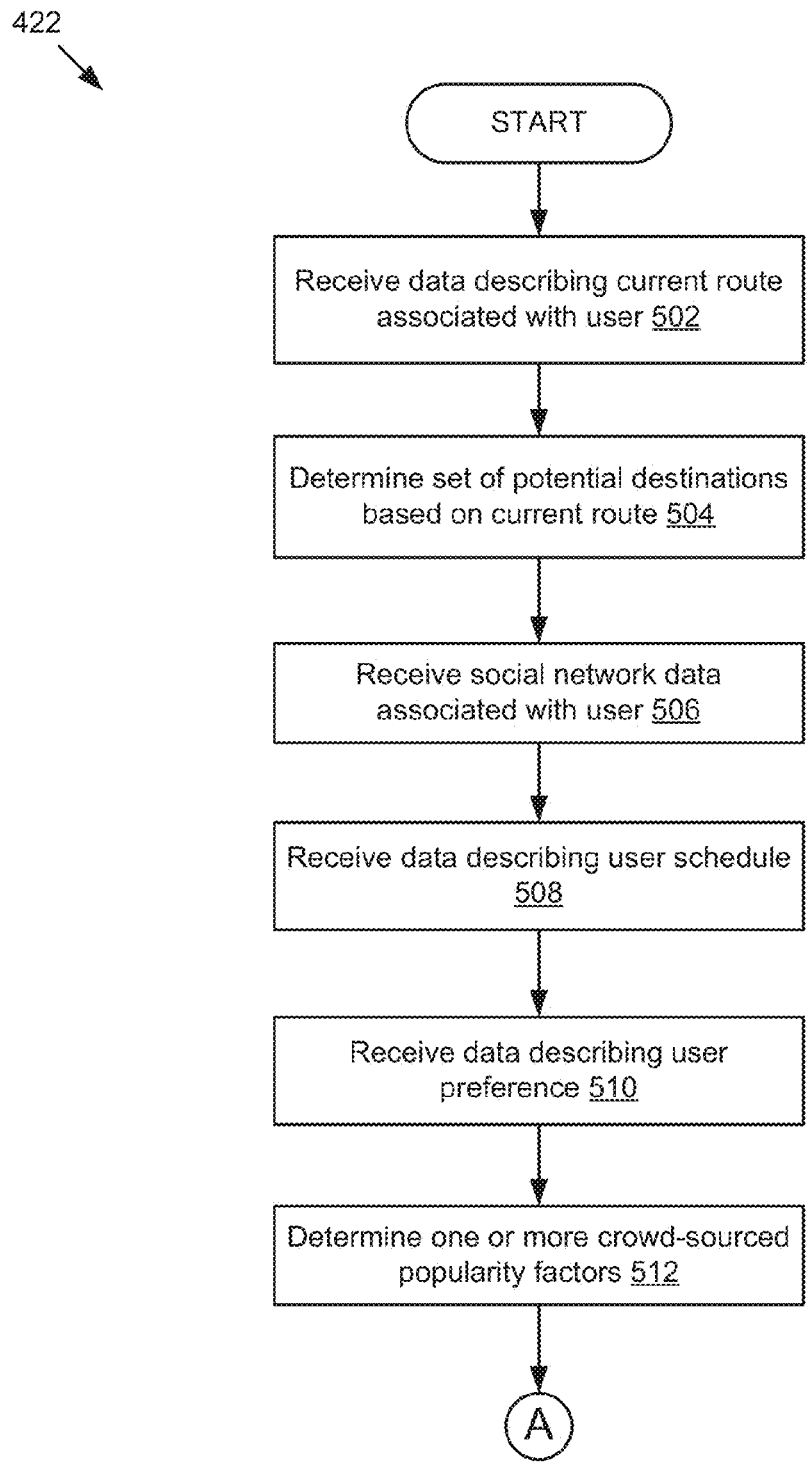
FIGS. 5A and 5B are flowcharts of an example method for estimating destination regions based on crowd-sourced popularity factors.
Figure 5B:
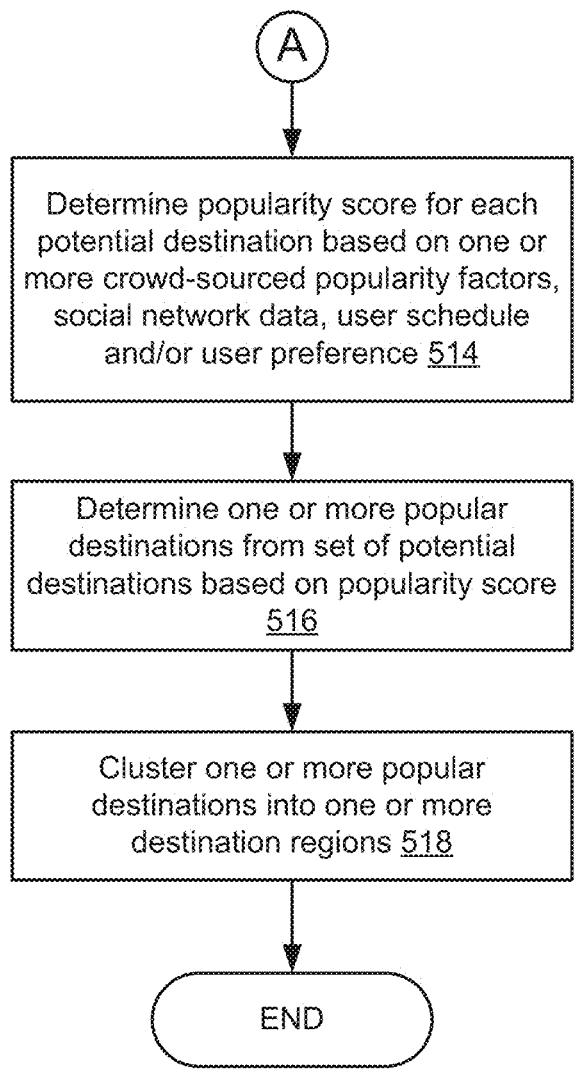

FIGS. 5A and 5B are flowcharts of an example method 422 for estimating destination regions based on crowd-sourced popularity factors. Referring to FIG. 5A, the popularity determination module 208 can receive 502 data describing a current route associated with the user from the location module 204 and/or the storage 245. The popularity determination module 208 can determine 504 a set of potential destinations based on the current route. The communication module 202 can receive 506 social network data associated with the user from the social network server 130 and/or the storage 245. The communication module 202 can receive 508 data describing a user schedule from the schedule server 120 and/or the storage 245. The communication module 202 can receive 510 data describing one or more user preferences from the social network server 130 and/or the storage 245, etc. The popularity determination module 208 can determine 512 one or more crowd-sourced popularity factors. An example method for determining one or more crowd-sourced popularity factors is illustrated with reference to at least FIG. 7.

Referring to FIG. 5B, the popularity determination module 208 can determine 514 a popularity score for each potential destination based on one or more of the one or more crowd-sourced popularity factors, the social network data, the schedule data, the messaging data, and/or the user preferences. An example method for determining a popularity score is illustrated with reference to at least FIGS. 8A-8C. The estimation module 210 can determine 516 one or more popular destinations from the set of potential destinations based on the popularity scores. For example, the estimation module 210 can determine one or more popular destinations as one or more destinations having the highest popularity scores. In another example, the estimation module 210 can determine one or more popular destinations as one or more destinations whose popularity scores are above a predetermined threshold. The estimation module 210 can cluster 518 the one or more popular destinations into one or more destination regions.

Figure 6A:
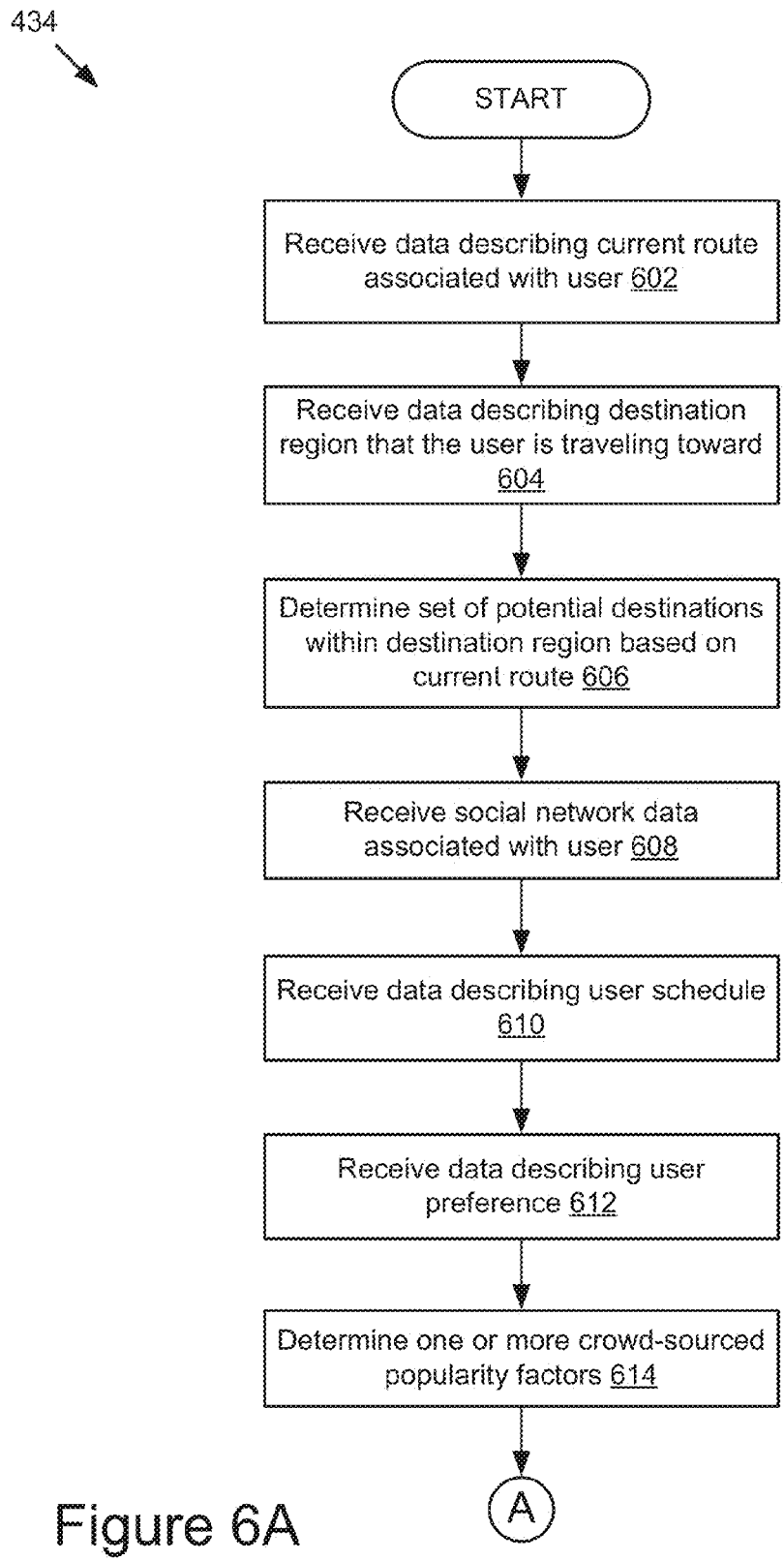
FIGS. 6A and 6B are flowcharts of an example method for estimating refined destinations based on crowd-sourced popularity factors.
Figure 6B:
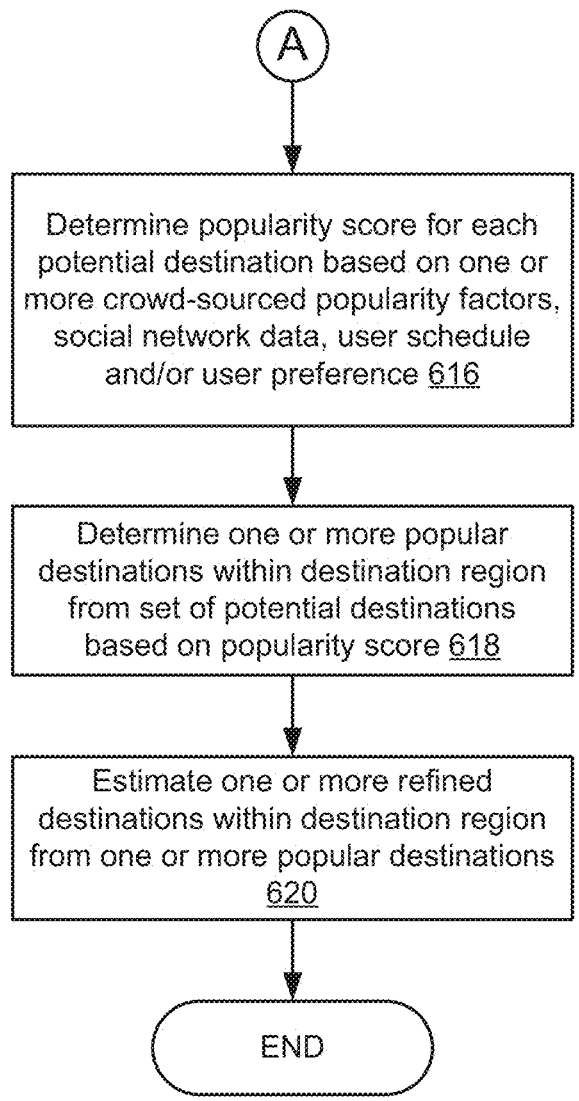

FIGS. 6A and 6B are flowcharts of an example method 434 for estimating refined destinations based on crowd-sourced popularity factors. Referring to FIG. 6A, the popularity determination module 208 can receive 602 data describing a current route associated with the user from the location module 204 and/or the storage 245. The popularity determination module 208 can receive 604 data describing a destination region that the user is traveling toward from the estimation module 210 and/or the storage 245. The popularity determination module 208 can determine 606 a set of potential destinations with the destination region based on the current route. The communication module 202 can receive 608 social network data associated with the user from the social network server 130 and/or the storage 245. The communication module 202 can receive 610 data describing a user schedule from the schedule server 120 and/or the storage 245. The communication module 202 can receive 612 data describing one or more user preferences from the social network server 130 and/or the storage 245. The popularity determination module 208 can determine 614 one or more crowd-sourced popularity factors. An example method for determining one or more crowd-sourced popularity factors is illustrated with reference to at least FIG. 7.

Referring to FIG. 6B, the popularity determination module 208 can determine 616 a popularity score for each potential destination within the destination region based on the one or more crowd-sourced popularity factors, the social network data, the user schedule and/or the user preferences. An example method for determining a popularity score is illustrated with reference to at least FIGS. 8A-8C. The estimation module 210 can determine 618 one or more popular destinations within the destination region from the set of potential destinations based on the popularity scores. For example, the estimation module 210 can determine one or more popular destinations as one or more destinations having the highest popularity scores. In another example, the estimation module 210 can determine one or more popular destinations as one or more destinations whose popularity scores satisfy a predetermined threshold. The estimation module 210 can estimate 620 one or more refined destinations within the destination region. For example, the estimation module 210 can select one or more popular destinations that have the highest popular scores among all the popular destinations as the one or more refined destinations. In another example, the estimation module 210 can cluster all the popular destinations within the destination region into one or more refined destination regions, where each refined destination region can be a sub-region of the destination region and include at least one popular destination.

Figure 7:
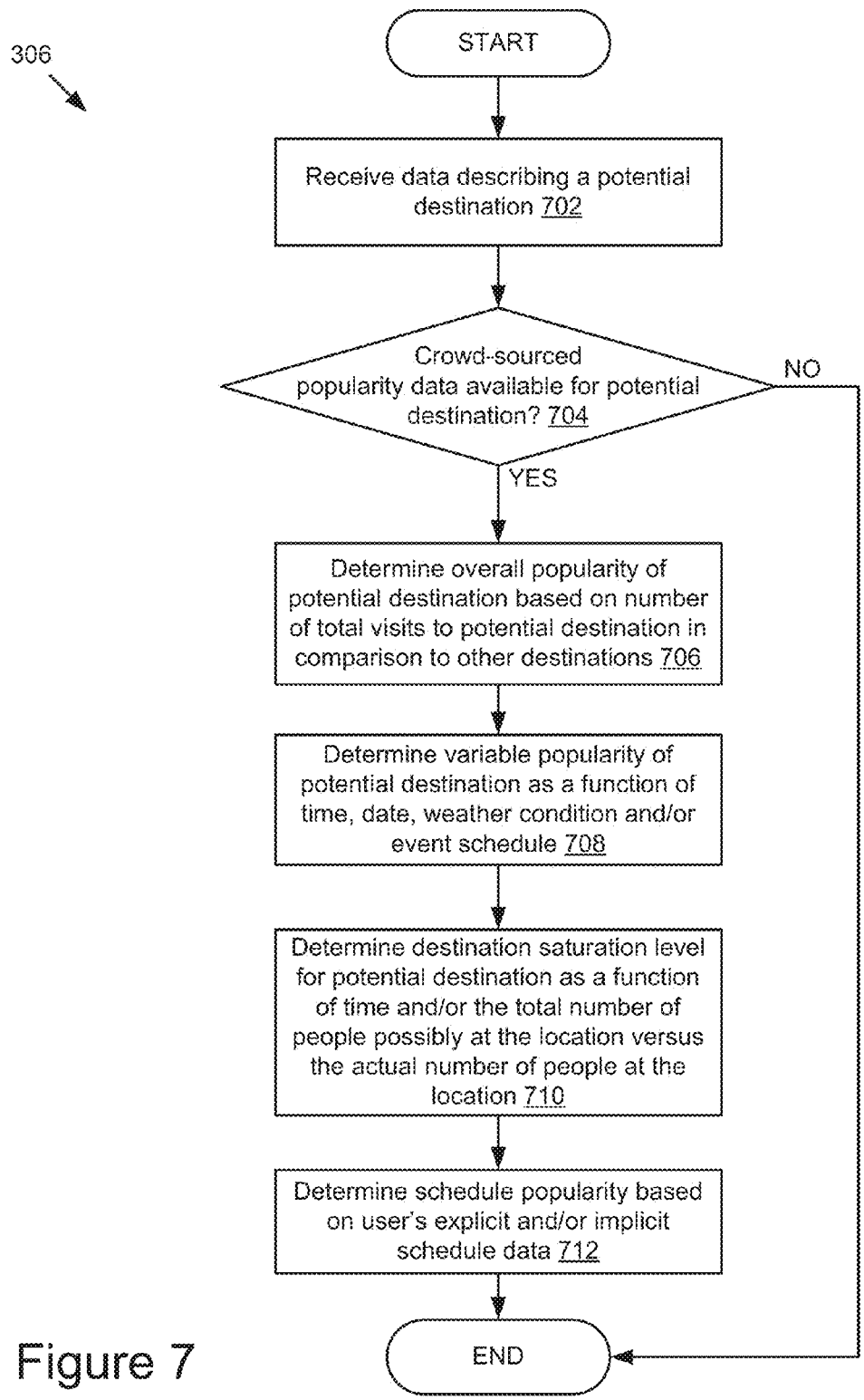
FIG. 7 is a flowchart of an example method for determining one or more crowd-sourced popularity factors.

FIG. 7 is a flowchart of an example method 306 for determining one or more crowd-sourced popularity factors. The popularity determination module 208 can receive 702 data describing a potential destination from the storage 245. The popularity determination module 208 can determine 704 whether crowd-sourced popularity data is available for the potential destination. If the crowd-sourced popularity data is available, the method 306 can move to block 706. Otherwise, the method 306 can end or repeat. At block 706, the popularity determination module 208 can determine an overall popularity of the potential destination based on the number of total visits to the potential destination in comparison to other destinations.

The popularity determination module 208 can determine 708 a variable popularity of the potential destination as a function of the time of the day, the date, weather condition and/or event schedules at the potential destination. The popularity determination module 208 can determine 710 a destination saturation level for the potential destination as a function of the time of the day and/or the total number of people possibly at the location versus the actual number of people currently at the location. The popularity determination module 208 can determine 712 a schedule popularity based on the user's explicit and/or implicit schedule data.

Figure 8A:
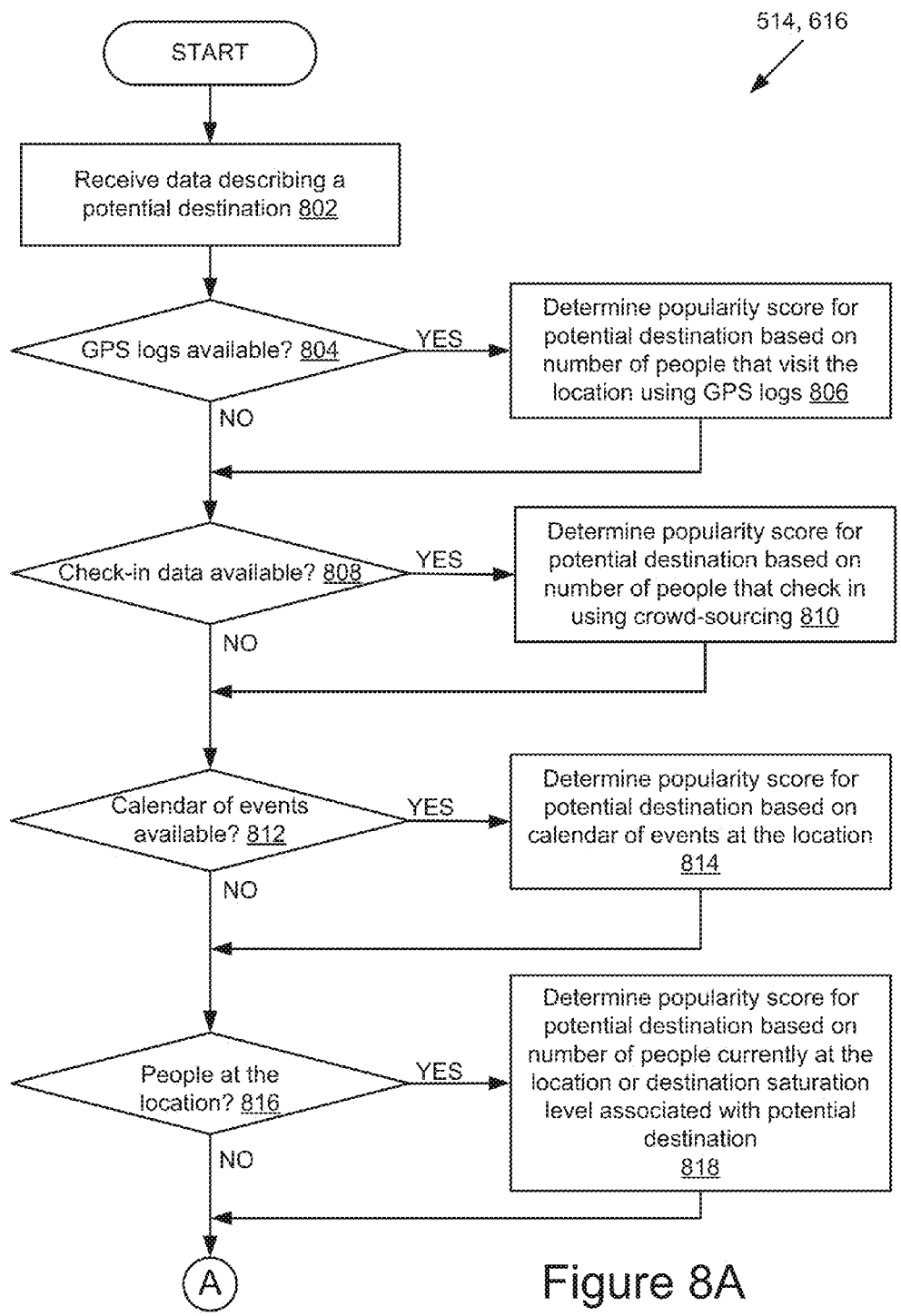
FIGS. 8A-8C are flowcharts of an example method for determining a popularity score for a potential destination.
Figure 8B:
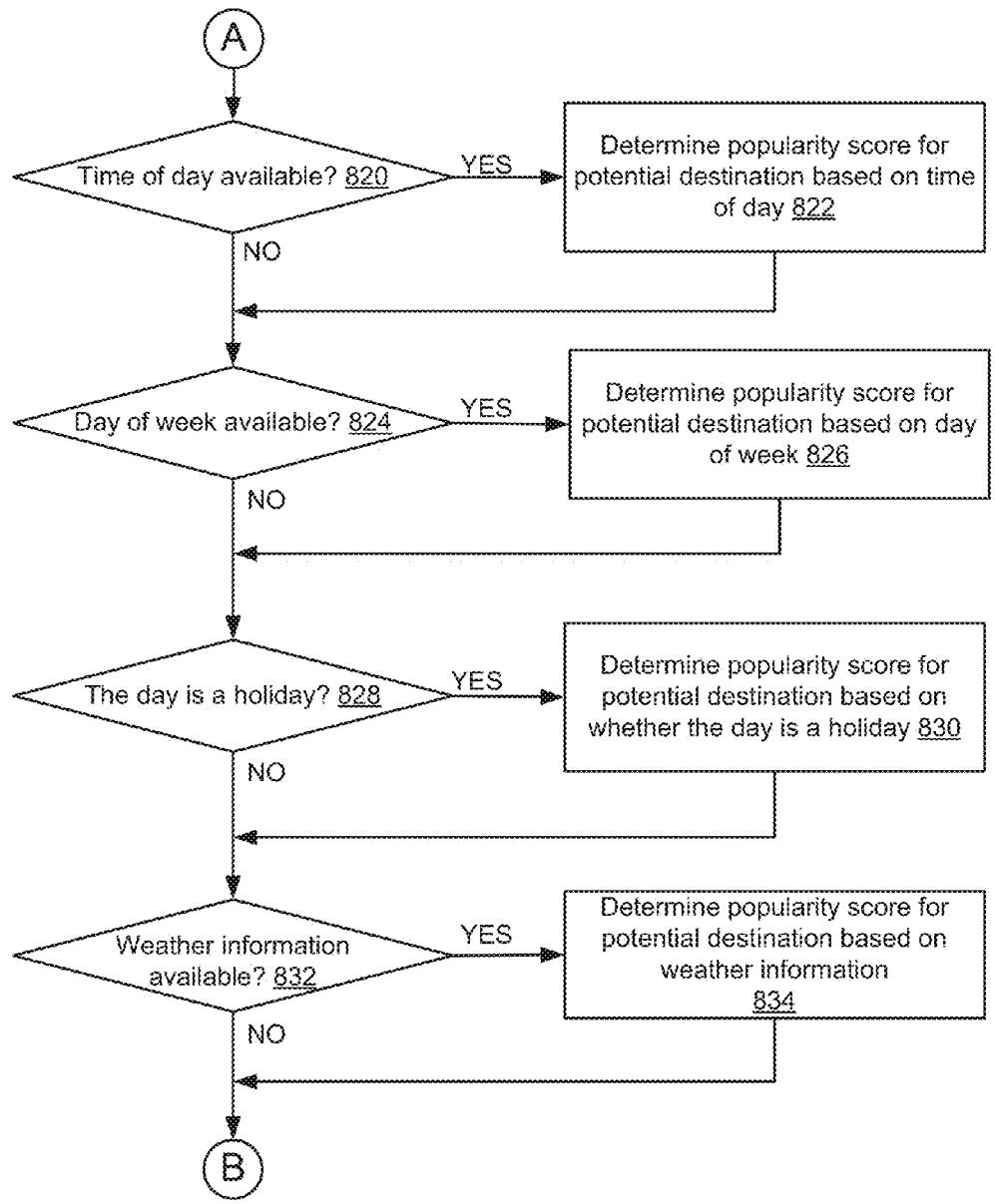
Figure 8C:
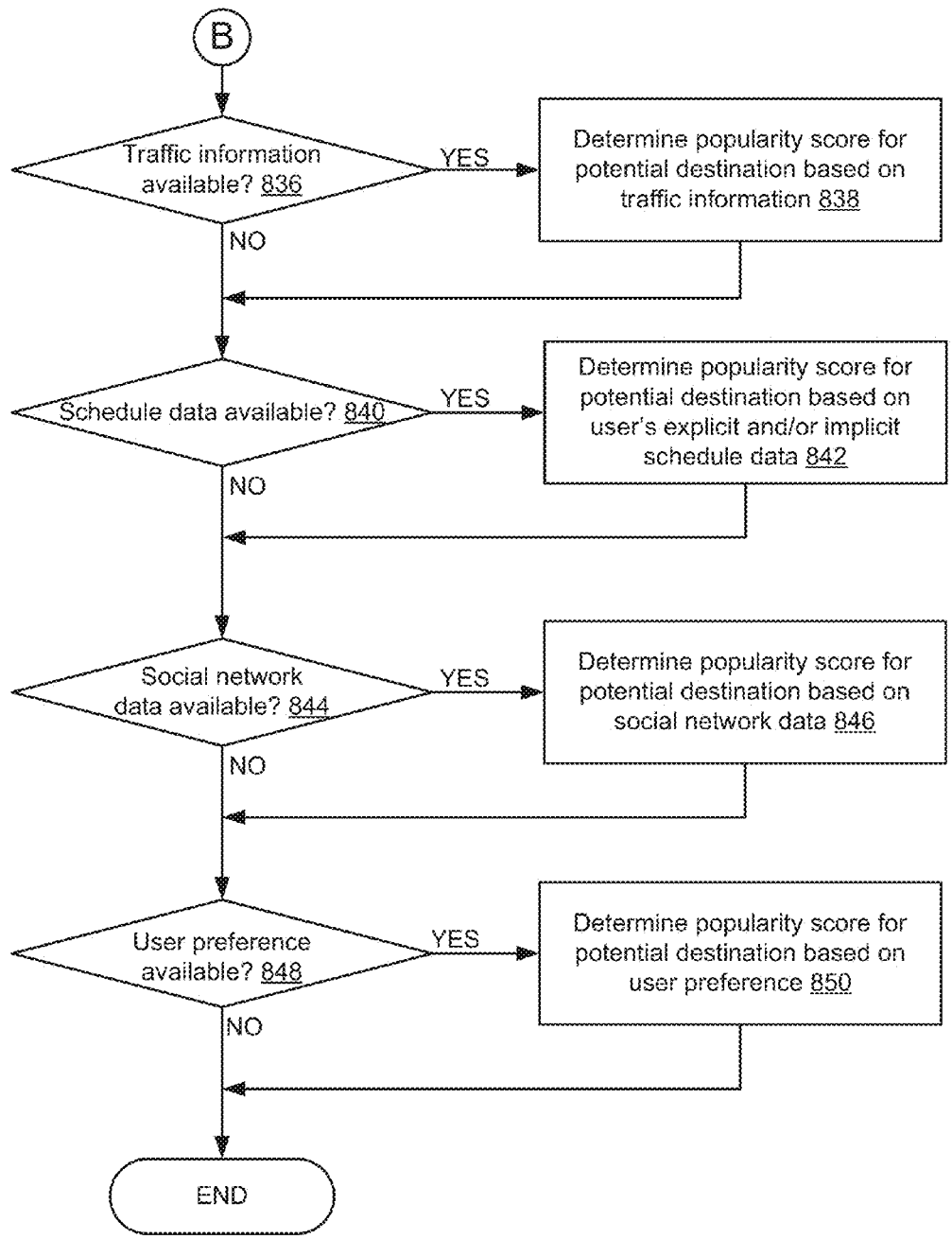

FIGS. 8A-8C are flowcharts of an example method 514 or 616 for determining a popularity score for a potential destination. Referring to FIG. 8A, the popularity determination module 208 can receive 802 data describing a potential destination from the storage 245. The popularity determination module 208 can determine 804 whether GPS logs are available for the potential destination. The GPS logs can describe historical journeys taken by people to the potential destination. If the GPS logs are available, the method can move to block 806. Otherwise, the method can move to block 808. At block 806, the popularity determination module 208 can determine a popularity score for the potential destination based at least in part on the number of people that visit the location using GPS logs.

At block 808, the method can determine whether online check-in data is available for the potential destination. If the check-in data is available, the method can move to block 810. Otherwise, the method can move to block 812. At block 810, the popularity determination module 208 can determine a popularity score for the potential destination based at least in part on the number of people that check in the location using crowd-sourcing applications.

At block 812, the method can determine whether data describing calendar of events at the potential destination is available. If the data describing calendar of events is available, the method can move to block 814. Otherwise, the method can move to block 816. At block 814, the popularity determination module 208 can determine a popularity score for the potential destination based at least in part on the calendar of events at the location.

At block 816, the method can determine whether there are people at the location of the potential destination. If there are people at the location, the method can move to block 818. Otherwise, the method can move to block 820 in FIG. 8B. At block 818, the popularity determination module 208 can determine a popularity score for the potential destination based at least in part on the number of people currently at the location or based at least in part on the destination saturation level associated with the potential destination.

Referring to FIG. 8B, the method can determine 820 whether data describing the time of the day is available. If the data describing the time of the day is available, the method can move to block 822. Otherwise, the method can move to block 824. At block 822, the popularity determination module 208 can determine a popularity score for the potential destination based at least in part on the time of the day.

At block 824, the method can determine whether data describing the day of the week is available. If the data describing the day of the week is available, the method can move to block 826. Otherwise, the method can move to block 828. At block 826, the popularity determination module 208 can determine a popularity score for the potential destination based at least in part on the day of the week.

At block 828, the method can determine whether the day is a holiday. If the day is a holiday, the method can move to block 830. Otherwise, the method can move to block 832. At block 830, the popularity determination module 208 can determine a popularity score for the potential destination based at least in part on whether the day is a holiday.

At block 832, the method can determine whether weather information is available. If weather information is available, the method can move to block 834. Otherwise, the method can move to block 836. At block 834, the popularity determination module 208 can determine a popularity score for the potential destination based at least in part on the weather information.

Referring to FIG. 8C, the method can determine 836 whether traffic information associated with the user's current route is available. If the traffic information is available, the method can move to block 838. Otherwise, the method can move to block 840. At block 838, the popularity determination module 208 can determine a popularity score for the potential destination based at least in part on the traffic information.

At block 840, the method can determine whether schedule data associated with the user is available. If the schedule data is available, the method can move to block 842. Otherwise, the method can move to block 844. At block 842, the popularity determination module 208 can determine a popularity score for the potential destination based at least in part on the user's explicit and/or implicit schedule data.

At block 844, the method can determine whether social network data associated with the user is available. If the social network data is available, the method can move to block 846. Otherwise, the method can move to block 848. At block 846, the popularity determination module 208 can determine a popularity score for the potential destination based at least in part on the social network data.

At block 848, the method can determine whether data describing the user's preference is available. If the data describing the user's preference is available, the method can move to block 850. Otherwise, the method can end or repeat. At block 850, the popularity determination module 208 can determine a popularity score for the potential destination based at least in part on the user's preference.

The popularity score determined by the method 800 may be based singly on one of the number of people that visit the location using GPS logs, the number of people that check in at the location using crowd-sourcing, the calendar of events at the location, the number of people currently at the location, the time of the day, the day of the week, whether the day is a holiday, weather information, traffic information, the user's explicit and/or implicit schedule data, the social network data and/or the user preference, etc., as discussed above, or may be a composite score of two or more of these factors, which weights the factors equally or differently.

Graphic Representations

Figure 9:
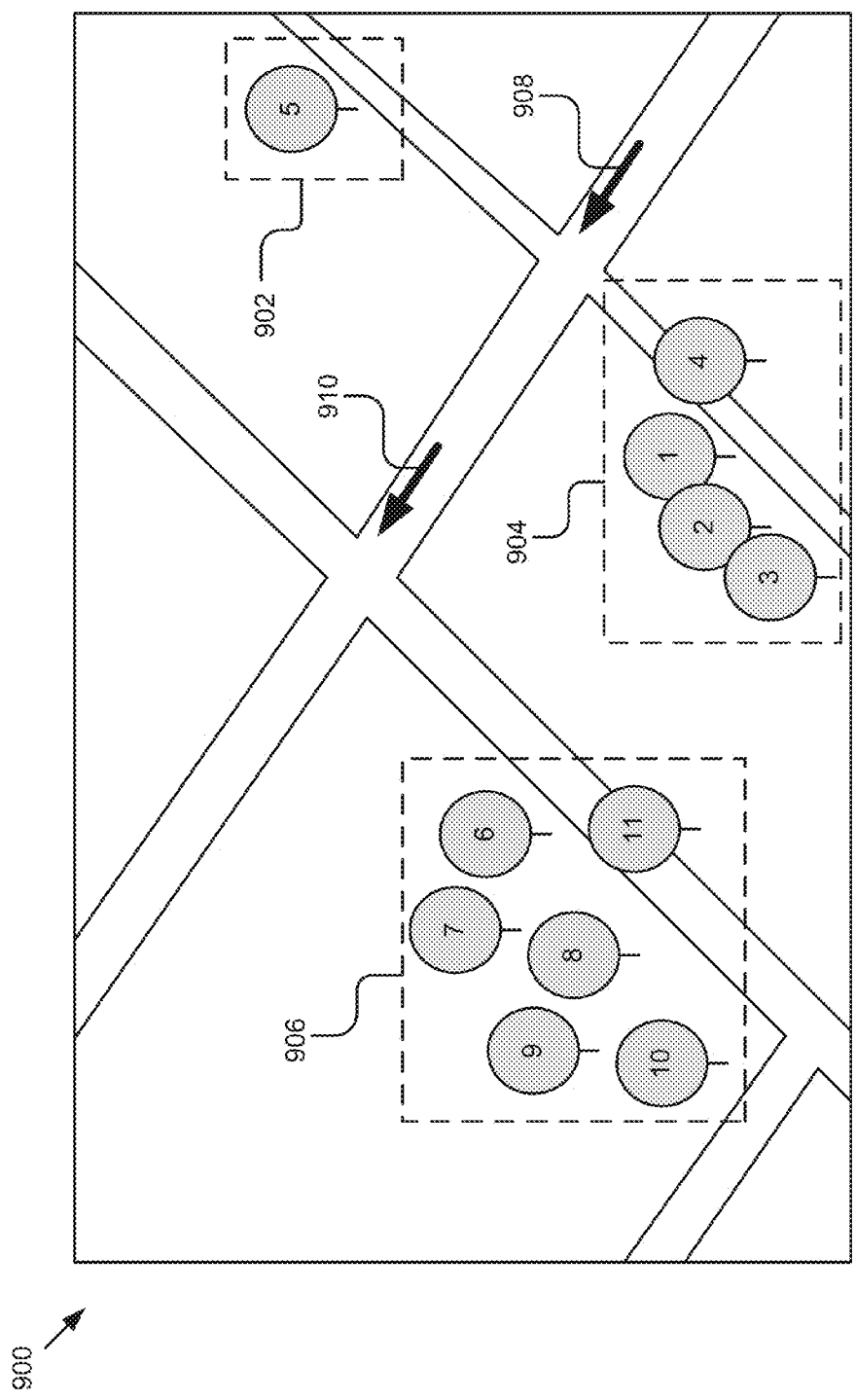
FIG. 9 is a graphic representation illustrating an example process to estimate journey destinations.

FIG. 9 is a graphic representation 900 illustrating an example process for estimating journey destinations. In the example graphic representation 900, a user is traveling in a vehicle equipped with the navigation application 109 on a road along a route (e.g., estimated, predetermined, etc.). As the user approaches a first intersection as illustrated by an arrow 908, the estimation module 210 estimates destination regions 902, 904 and 906 for the user. The destination region 902 includes one popular destination. The destination region 904 includes 4 popular destinations. The destination region 906 includes 6 popular destinations. The estimation module 210 can provide each destination region as a suggestion to the user and may further refine the suggestion for the user as the user is traveling closer to a particular destination region. The estimation module 210 may also update or refine the estimated destination regions as the user is traveling further away from a particular destination region.

At the first intersection illustrated by the arrow 908, the user can take a left turn to the destination region 904, take a right turn to the destination region 902 or continue traveling down the current road to the destination region 906. Assume the user selects to travel down the current road and approaches a second intersection illustrated by an arrow 910. The user can take a left turn to the destination region 906 or a right turn to a region with no popular destinations. If the user takes a left turn at the second intersection, the estimation module 210 can refine the destination predictions for the user within the destination region 906. If the user takes a right turn at the second intersection, the estimation module 210 can cooperate with other components of the navigation application 109 to update the journey destination estimations for the user.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented networked method comprising:
   receiving location data from one or more of a geolocation determination device and a computing device configured to provide a location-related information signal;
   determining a current route associated with a user based on the location data;
   determining a set of potential destinations;
   determining one or more crowd-sourced popularity factors;
   clustering one or more popular destinations from the potential destinations of the set into two or more different destination regions along the current route based on the one or more crowd-sourced popularity factors;
   determining that the user is traveling toward a first destination region from among the two or more destination regions;
   estimating one or more refined destinations within the first destination region based on the one or more crowd-sourced popularity factors; and
   suggesting the one or more refined destinations to the user.

2. The method of claim 1, wherein determining the one or more crowd-sourced popularity factors comprises:
   receiving data describing the set of potential destinations; and
   determining one or more of an overall popularity for each potential destination, a variable popularity for each potential destination, a destination saturation level for each potential destination, and a schedule popularity for each potential destination based on schedule data associated with the user.

3. The method of claim 2, wherein the overall popularity for a particular potential destination included in the set of potential destinations is determined based at least in part on a number of total visits to the particular potential destination in comparison to other potential destinations included in the set.

4. The method of claim 2, wherein the variable popularity for a particular potential destination in the set of potential destinations is determined based at least in part on one or more of a time of day, a day of week, a weather condition, a date, and a schedule of events.

5. The method of claim 2, wherein the destination saturation level for a particular potential destination in the set of potential destinations is determined based at least in part on a comparison between a total number of people possibly to be accommodated at the particular potential destination and an actual number of people at the particular potential destination.

6. The method of claim 2, further comprising:
   determining a popularity score for each potential destination in the set of potential destinations based at least in part on one or more of the overall popularity, the variable popularity, the destination saturation level, and the schedule popularity, wherein clustering the one or more popular destinations from the potential destinations of the set in to the two or more different destinations regions along the current route is based on the popularity score corresponding to each of the one or more popular destinations of each of the two or more different destination regions.

7. A computer program product comprising a non-transitory computer usable medium including a computer readable program, wherein the computer readable program when executed on a computer causes the computer to:
   receive location data from one or more of a geolocation determination device and a computing device configured to provide a location-related information signal;
   determine a set of potential destinations;
   determine a current route associated with a user based on the location data;
   determine one or more crowd-sourced popularity factors;
   cluster one or more popular destinations from the potential destinations of the set into two or more different destination regions along the current route based on the one or more crowd-sourced popularity factors; and
   determine that the user is traveling toward a first destination region from among the two or more destination regions;
   estimate one or more refined destinations within the first destination region based on the one or more crowd-sourced popularity factors; and
   suggest the one or more refined destinations to the user.

8. The computer program product of claim 7, wherein determining the one or more crowd-sourced popularity factors comprises:
   receiving data describing the set of potential destinations; and
   determining one or more of an overall popularity for each potential destination, a variable popularity for each potential destination, a destination saturation level for each potential destination, and a schedule popularity for each potential destination based on schedule data associated with the user.

9. The computer program product of claim 8, wherein the overall popularity for a particular potential destination included in the set of potential destinations is determined based on a number of total visits to the particular potential destination in comparison to other potential destinations included in the set.

10. The computer program product of claim 8, wherein the variable popularity for a particular potential destination in the set of potential destinations is determined based at least in part on one or more of a time of day, a day of week, a weather condition, a date, and a schedule of events.

11. The computer program product of claim 8, wherein the destination saturation level for a particular potential destination in the set of potential destinations is determined based at least in part on a comparison between a total number of people possibly to be accommodated at the particular potential destination and an actual number of people at the particular potential destination.

12. The computer program product of claim 8, further comprising:
   determining a popularity score for each potential destination in the set of potential destinations based at least in part on one or more of the overall popularity, the variable popularity, the destination saturation level, and the schedule popularity, wherein clustering the one or more popular destinations from the potential destinations of the set in to the two or more different destinations regions along the current route is based on the popularity score corresponding to each of the one or more popular destinations of each of the two or more different destination regions.

13. A system comprising:
   a processor; and
   a memory storing instructions that, when executed, cause the system to:
      receive location data from one or more of a geolocation determination device and a computing device configured to provide a location-related information signal;
      determine a set of potential destinations;
      determine a current route associated with a user based on the location data;
      determine one or more crowd-sourced popularity factors;
      cluster one or more popular destinations from the potential destinations of the set into two or more different destination regions along the current route based on the one or more crowd-sourced popularity factors;
      determine that the user is traveling toward a first destination region from among the two or more destination regions;
      estimate one or more refined destinations within the first destination region based on the one or more crowd-sourced popularity factors; and
      suggest the one or more refined destinations to the user.

14. The system of claim 13, wherein the instructions when executed cause the system to determine the one or more crowd-sourced popularity factors by:
   receiving data describing the set of potential destinations; and
   determining one or more of an overall popularity for each potential destination, a variable popularity for each potential destination, a destination saturation level for each potential destination, and a schedule popularity for each potential destination based on schedule data associated with the user.

15. The system of claim 14, wherein the overall popularity for a particular potential destination included in the set of potential destinations is determined based on a number of total visits to the particular potential destination in comparison to other potential destinations included in the set.

16. The system of claim 14, wherein the variable popularity for a particular potential destination in the set of potential destinations is determined based at least in part on one or more of a time of day, a day of week, a weather condition, a date, and a schedule of events.

17. The system of claim 14, wherein the destination saturation level for a particular potential destination in the set of potential destinations is determined based at least in part on a comparison between a total number of people possibly to be accommodated at the particular potential destination and an actual number of people at the particular potential destination.

18. The system of claim 14, wherein the instructions when executed cause the system also:
   determining a popularity score for each potential destination in the set of potential destinations based at least in part on one or more of the overall popularity, the variable popularity, the destination saturation level, and the schedule popularity, wherein clustering the one or more popular destinations from the potential destinations of the set in to the two or more different destinations regions along the current route is based on the popularity score corresponding to each of the one or more popular destinations of each of the two or more different destination regions.

* * * * *